United States Patent [19]
Lee

[11] Patent Number: 6,079,941
[45] Date of Patent: Jun. 27, 2000

[54] MOVING SYSTEM

[75] Inventor: William S. Lee, Westwego, La.

[73] Assignee: Lee Inventions, Inc., Westwego, La.

[21] Appl. No.: 08/514,873

[22] Filed: Aug. 14, 1995

[51] Int. Cl.$^7$ ....................................... B60P 1/00
[52] U.S. Cl. ........................ 414/812; 414/537; 280/656; 280/79.11; 16/35 R
[58] Field of Search ................... 414/537, 538, 414/786, 812; 280/763.1, 764.1, 638, 656, 47.34, 79.11; 16/35 R; 188/5; 410/51

[56] References Cited

U.S. PATENT DOCUMENTS

| | | | |
|---|---|---|---|
| 2,773,614 | 12/1956 | Edwards et al. | 280/656 X |
| 2,888,088 | 5/1959 | Claas et al. | 280/638 X |
| 2,897,910 | 8/1959 | Steely et al. | 280/79.11 X |
| 3,233,767 | 2/1966 | Goodacre | 414/537 X |
| 3,313,377 | 4/1967 | Anirger | 188/5 |
| 3,411,802 | 11/1968 | Diller | 280/79.11 |
| 3,556,561 | 1/1971 | Gingue | 16/35 R X |
| 3,633,774 | 1/1972 | Lee | 280/79.11 X |
| 3,690,481 | 9/1972 | Pelletier | 414/537 |
| 3,804,275 | 4/1974 | Lee | 414/537 X |
| 3,879,053 | 4/1975 | Chvala | 280/79.11 X |
| 3,885,691 | 5/1975 | Knapp | 280/656 X |
| 4,098,414 | 7/1978 | Abiera | 414/537 |
| 4,127,202 | 11/1978 | Jennings et al. | 414/537 |
| 4,166,638 | 9/1979 | De Prado | 280/638 |
| 4,281,950 | 8/1981 | Lehman et al. | 414/537 X |
| 4,655,466 | 4/1987 | Hanaoka | 280/47.34 X |
| 4,657,233 | 4/1987 | Vroom | 414/537 X |
| 4,669,944 | 6/1987 | Tarbell | 414/537 X |
| 5,035,445 | 7/1991 | Poulin | 280/79.11 |
| 5,115,539 | 5/1992 | Lee | 16/35 R |
| 5,170,529 | 12/1992 | Kovacs | 16/35 R |
| 5,201,628 | 4/1993 | Driver | 414/538 |
| 5,449,184 | 9/1995 | Knoblach | 188/5 X |

Primary Examiner—Douglas Hess
Attorney, Agent, or Firm—C. Emmett Pugh; Pugh Associates

[57] ABSTRACT

A moving system (1/101) made up of a number of separable but intergratable parts and platform sections (10–90/110–190), including an elastically biased, pivoted, integral end ramp section (10) which can be pivoted and moved down to allow the load (e.g. a copier with "convenience casters") to be rolled up onto platform sections (40 & 50/140 & 150) for movement from one location to another. The moving system also includes the following additional parts or sections—in one embodiment or the other a supplemental ramp piece (120) which is usually stored on the exterior side of the ramp end section (110) when not in use but is connectable to the end of the main ramp section to extend the effective ramping distance; a protective pad (30/130) for the ramp end section; a first platform section (40/140); a second platform section (50/150), as well as an auxiliary, pivoting, intermediate braking support member (160); a handle end section (70/170); an extendible handle (80/180); and an interconnecting, ninety (90°) degree, leg section (90/190). The platform sections include four supporting caster wheels (20/142 & 152), the two at the handle end being lockable into a straight disposition or alternatively unlocked to allow them to be free-wheeling. Foot operated mechanisms (21, 55, 59 & 62) are provided for quickly and easily latching and unlatching different parts. A pair of elastic "bungee" cord sections or springs (17) bias the end ramp section in both its vertical disposition and its ramping disposition by having its effective ends off-set with respect to the pivoting hinge for the ramp. The ramp section also includes an effective braking/immobilizing support (15/115).

9 Claims, 14 Drawing Sheets

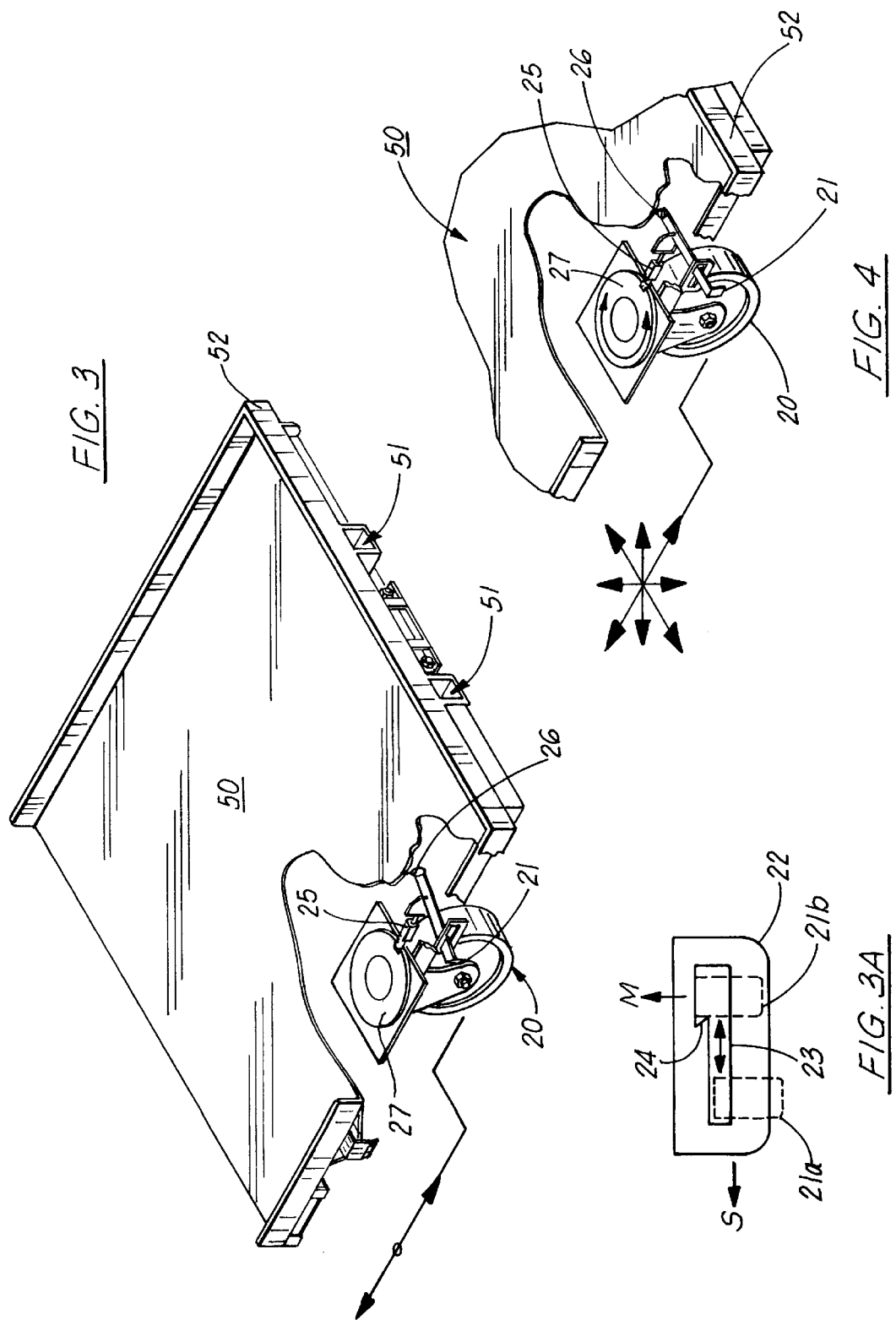

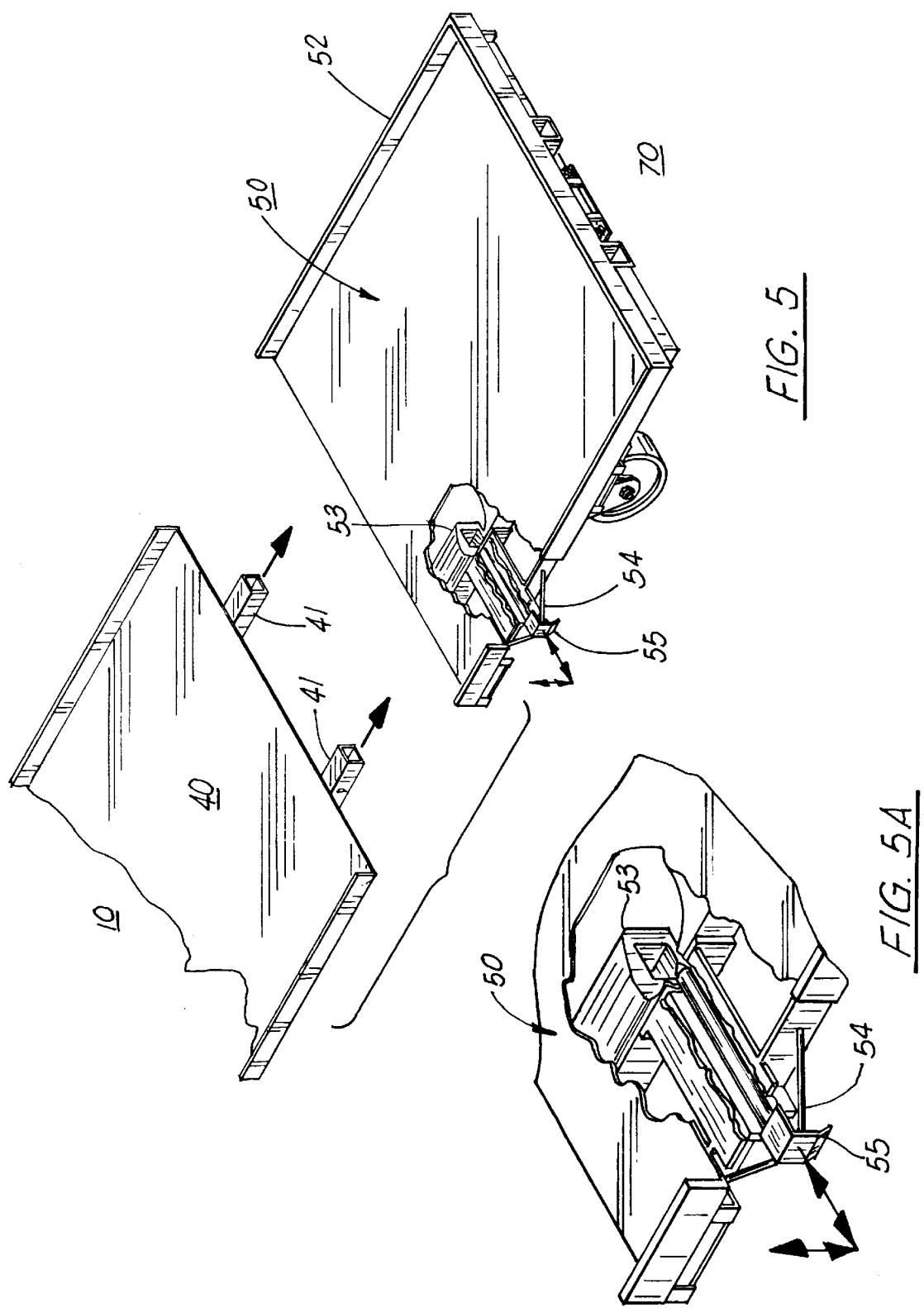

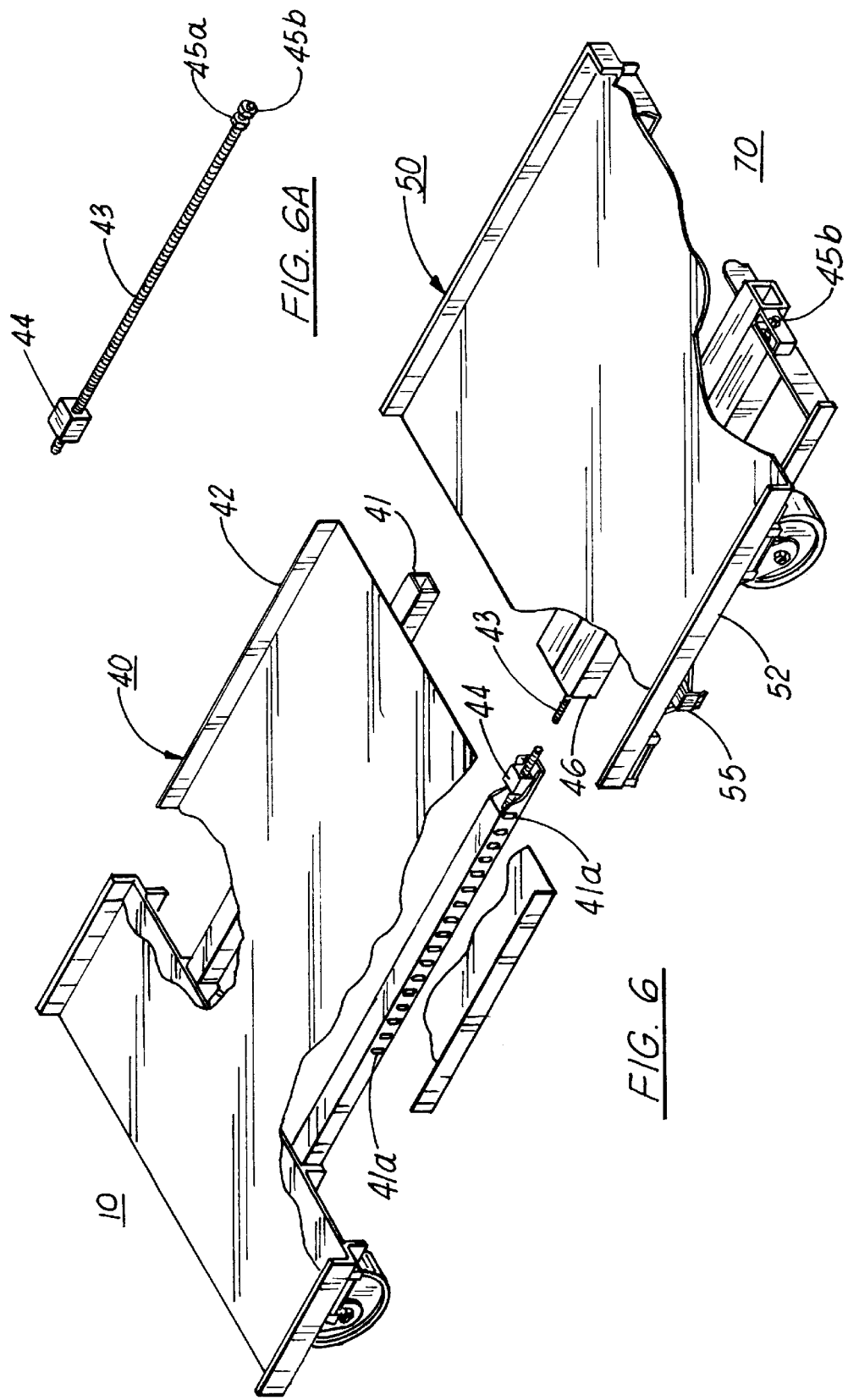

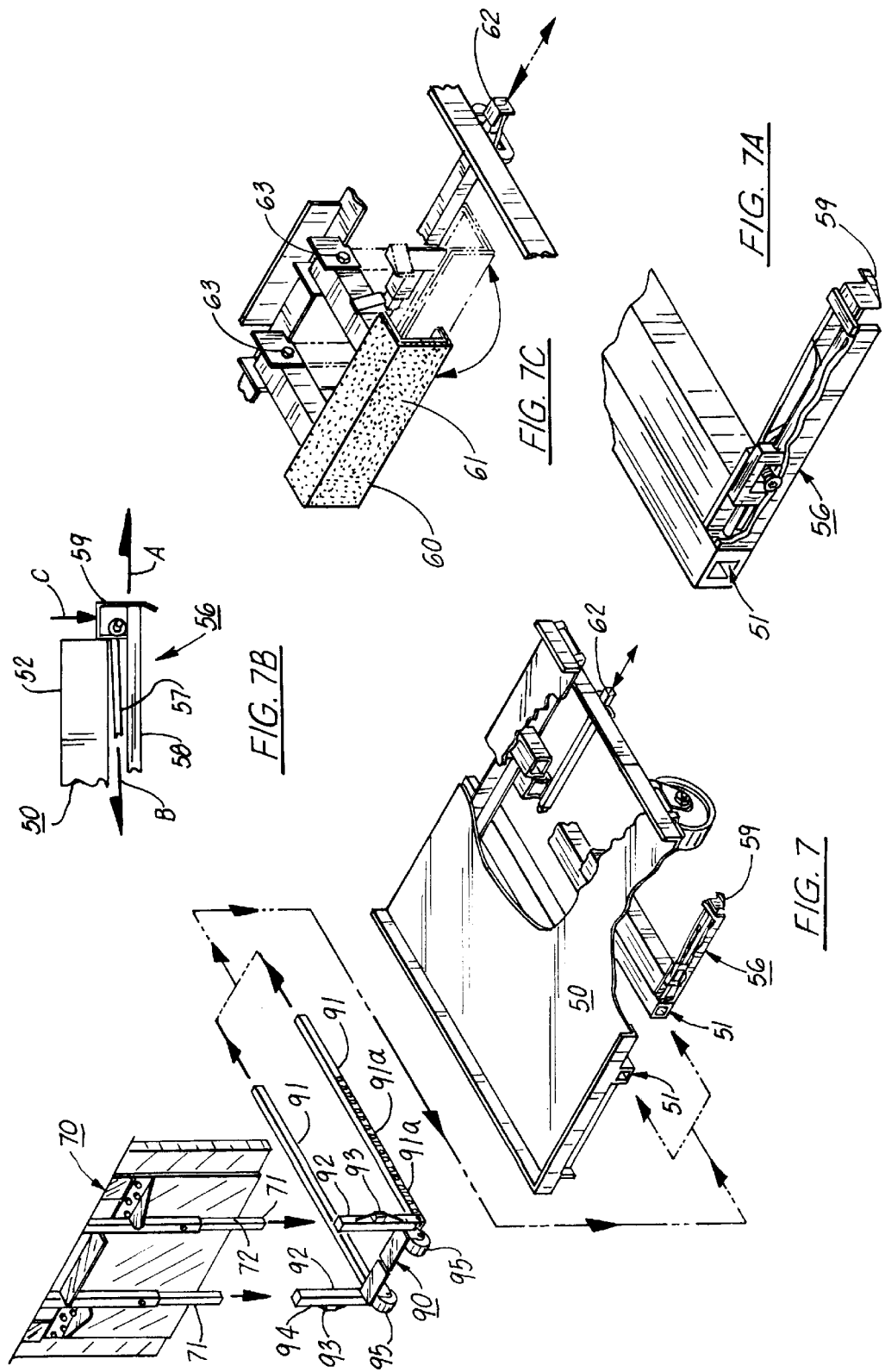

MOVING SYSTEM

REFERENCE TO RELATED APPLICATION

This application is a continuation-in-part of patent application Ser. No. 08/213,162 filed Mar. 15, 1994 entitled "Moving System With Flexibly Biased, Integral End Ramp", the disclosure of which is incorporated herein by reference.

TECHNICAL FIELD

The present invention relates to a moving system in which a wheeled load is loaded unto a moveable platform for transportation by rolling the wheeled load up a ramp onto the wheeled platform for subsequent moving of the load from one location to another. The invention more particularly and preferably is related to such a system which uses an integral end ramp section, which is moveable from its normal vertical end disposition down into an inclined ramping disposition to allow the wheeled load (such as, for example, a medium to large size copier with "convenience casters") to be wheeled up the ramp onto the platform section(s) of the moving system, after which the end ramp section is moved back up to its normal vertical disposition to provide a protective end to the platform section(s) during transportation of the load.

The present invention also is directed to various foot actuated or operated latches for:

locking the platforms caster wheels at, for example, the handle end of the platform, into a straight, longitudinal direction or, alternatively, to a free moving or free swiveling disposition, allowing the caster wheels to freely rotate or swivel about a vertical axis in any direction; and/or latching and unlatching telescoping, handle end and intermediate platform members to be relatively longitudinally moved with respect to one another and then re-set or re-latched, allowing the longitudinal effective length of the platform to be varied as needed for different sized loads; and/or unlatching an underlying auxiliary brake member. The latter is preferably achieved by having a slight offset for the effective elastic terminus points below the hinge point when the ramp end section is at or very near its ramping position. Because the weight of the ramp itself provides a built-in bias, little if any offset is needed for achieving and maintaining a bias for the ramp section to stay down when in its ramping disposition.

BACKGROUND ART

Copiers have become a standard piece of equipment in today's modern offices. As a result there is a substantial market in the moving or rigging of copiers from, for example, a copier storage warehouse to a customer's office site and ultimately back again.

Many of today's copiers are heavy, with most of them weighing up to about seven hundred (700#) pounds and some approaching two thousand (2,000#) pounds, and are bulky and difficult to move without damage to the machines and/or the surrounding structures. The present invention is especially but not exclusively directed to machines of at least a couple hundred pounds, particular copiers, as well as other wheeled loads.

For further general background information on this art area, reference is had to the inventor's own pioneering patent, U.S. Pat. No. 3,633,774 entitled "Moving System" issued Jan. 11, 1972, as well as the inventor's application Ser. No. 08/213,162 of Mar. 15, 1994.

A great need has arisen in this part of the moving industry to have reliable equipment to safely and quickly transport delicate but heavy goods such as copier machines and the like. Heretofore, many riggers used generally unassisted manual labor for the moves, putting at significant physical risk the workers themselves, with great risk of damage to the copiers as well.

The present invention is designed to fulfill this need by providing a reliable, quick, flexible and practical moving system for moving copiers and the like, particularly those which have "convenience casters," from one location to another in a way which protects both the worker(s) as well as the load and whose mechanisms for locking and unlocking caster wheels and for latching and unlatching longitudinally, relatively moveable members are foot actuated.

GENERAL SUMMARY DISCUSSION OF INVENTION

The present invention is preferably directed to a heavy duty, commercial-grade, moving system which can easily change the effective length of its load bearing platform section(s) to accommodate and work with many different sized loads and preferably uses a flexibly biased, integrated end ramp section, which can be pivoted or hinged and moved down as a ramp to allow the load (e.g. a copier with "convenience casters") to be rolled up onto the platform section(s) for movement of the load from one location to another. More particularly, the end ramp section is biased in the preferred embodiment by a pair of flanking, extended, elastic members (e.g. "bungee" cords), each of which extends down from a position well above the pivot or hinge point to an effective terminus below and to the inner side of the pivot or hinge point. This off-set causes the elastic members to bias the end ramp section to its vertical disposition when the ramp is raised but to bias it to its ramping disposition when it has been lowered past a point near to its ramping disposition.

Even more particularly, the present invention is directed to various foot actuated or operated locks or latches for:

locking the platforms caster wheels at, for example, the handle end of the platform, into a straight, longitudinal direction or, alternatively, to a free moving disposition, allowing the caster wheels to freely rotate about a vertical axis in any direction; and/or latching and unlatching telescoping, handle end and intermediate platform members to be relatively longitudinally moved with respect to one another and then re-set, allowing the longitudinal effective length of the platform to be varied as needed for different sized loads and also be easily and quickly latched and unlatched without bending over using only the movement of the user's foot to operate or actuate the latching mechanism; and/or unlatching an underlying auxiliary brake member.

The moving system includes a number of other innovative, utilitarian features, including:

braking/immobilizing support(s), longitudinally extendible platform and handle sections, a storable, supplemental ramp member, and related methodology, etc., all of which are fully described below.

It is thus an object of the present invention to provide a moving system which allows the user to quickly and easily load a heavy load onto the system and move it about.

It is a further object of the invention to provide such a moving system which can be easily adjusted to handle many different sizes and configurations of loads and can be safely and easily used.

It is a still further an object of the invention to provide such a moving system with an easily implemented ramping action with multiple ramping configurations.

It is a further, basic object of the invention to provide such a moving system which can be easily and quickly adjusted in its caster movement using foot actuation to in some instance restrict the movement of the caster wheels to a single, longitudinally straight direction, and in other instances to free wheeling mode, allowing the casters to be directed in any direction, which can be safely and easily used.

It is a still further, basic object of the invention to provide such a moving system which can be easily and quickly adjusted in its longitudinal length also using foot actuation to handle many different sizes and configurations of loads and can be safely and easily used.

It is a still further an object of the invention to provide such a moving system with an easily implemented ramping action with multiple ramping configurations.

It is another object to provide such a moving system in which all of the basic parts or sections are connected together and which do not take up any extra lateral or side room when the load is being loaded or unloaded.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein:

FIG. 3 is a perspective view of the handle end platform section from the other side of the system from the side shown in FIGS. 1 & 2, with the platform partially cut away to show the underlying caster locking elements in their locked, engaged positions which allows the corresponding caster wheel to only move in a straight, longitudinal direction (shown by the straight, doubled-headed directional arrow); while FIG. 3A is a simplified, side view showing the two positions (in phantom line) occupied by the foot actuated lever for alternatively locking and unlocking each of the caster wheel at the handle end of the moving system.

FIG. 4 is a perspective, partial view of the handle end platform, partially cut away to show the underlying caster locking elements (similar to FIG. 3) but in their free, unlocked, unengaged positions which allows the caster wheel to move in any direction (shown by the "compass" type, multi-directional arrows and the circular, double-headed directional arrow).

FIG. 5 is a perspective, partial view, again from the other side of the system shown in FIGS. 1 & 2, of the handle end platform section (with the handle section removed for simplicity purposes) and the ramp end platform (partially shown), with a part of the handle end platform being cut away to show the foot operated, latching mechanism for latching together and unlatching the two platform sections, with the smaller directional arrows showing the sequential directions of movement of the foot actuated pin member; while FIG. 5A is a perspective, detail view showing in greater close-up the foot operated, latching mechanism of FIG. 5 for latching together and unlatching the two platform sections.

FIG. 6 is a perspective view similar to that of FIG. 5, but showing the full lengths of the two platform sections and with different parts of the platform surfaces cut away to expose other underlying sub-elements including the ramp end male members with the near one having a series of locking holes, and the interengaging stop mechanism which prevents the two platform sections from being pulled completely apart; while FIG. 6A perspective, detail view showing in greater close-up the interengaging stop mechanism of FIG. 6 for preventing the two platform sections from being pulled completely apart when, for example, expanding the effective length of the platform sections.

FIG. 7 is an exploded, perspective view of the handle end parts and sections of the preferred, exemplary embodiment of the moving system of the present invention, with portions of some of the elements being cut-away to expose underlying parts, including a foot actuated, latching mechanism for latching and unlatching the handle sub-section to the handle end platform section, as well as the foot operated, unlatching mechanism for unlatching the auxiliary brake (with the brake mechanism itself removed for simplicity purposes and shown in FIG. 7C), with the perspective being from the handle end of the moving system from the same side shown in FIGS. 1 & 2; while FIG. 7A is a side, perspective, detail, close-up view of the foot actuated, latching mechanism for latching and unlatching the handle sub-section to the handle end platform section shown in FIG. 7 located on the underside of the handle end platform section;

FIG. 7B is a simplified, end view of the corner of the handle end platform section showing the latching mechanism of FIG. 7A in its extended-out (note directional arrow A), unlatched disposition in which it is temporarily held in position by the bottom edge of the platform until it is pressed down (note vertical directional arrow C), allowing the biasing, bungee cord (note leftwardly directed horizontal direction arrow B) to pull it back into its latching disposition.

FIG. 7C is a side, perspective, detail view of the foot actuated, latching mechanism for unlatching the auxiliary braking, support member located on the underside of the handle end platform section, part of which is shown in FIG. 7, which is returnable to its storage disposition by hand.

EXEMPLARY MODE FOR CARRYING OUT THE INVENTION

Moving System Parts & Structure

Figure 1:
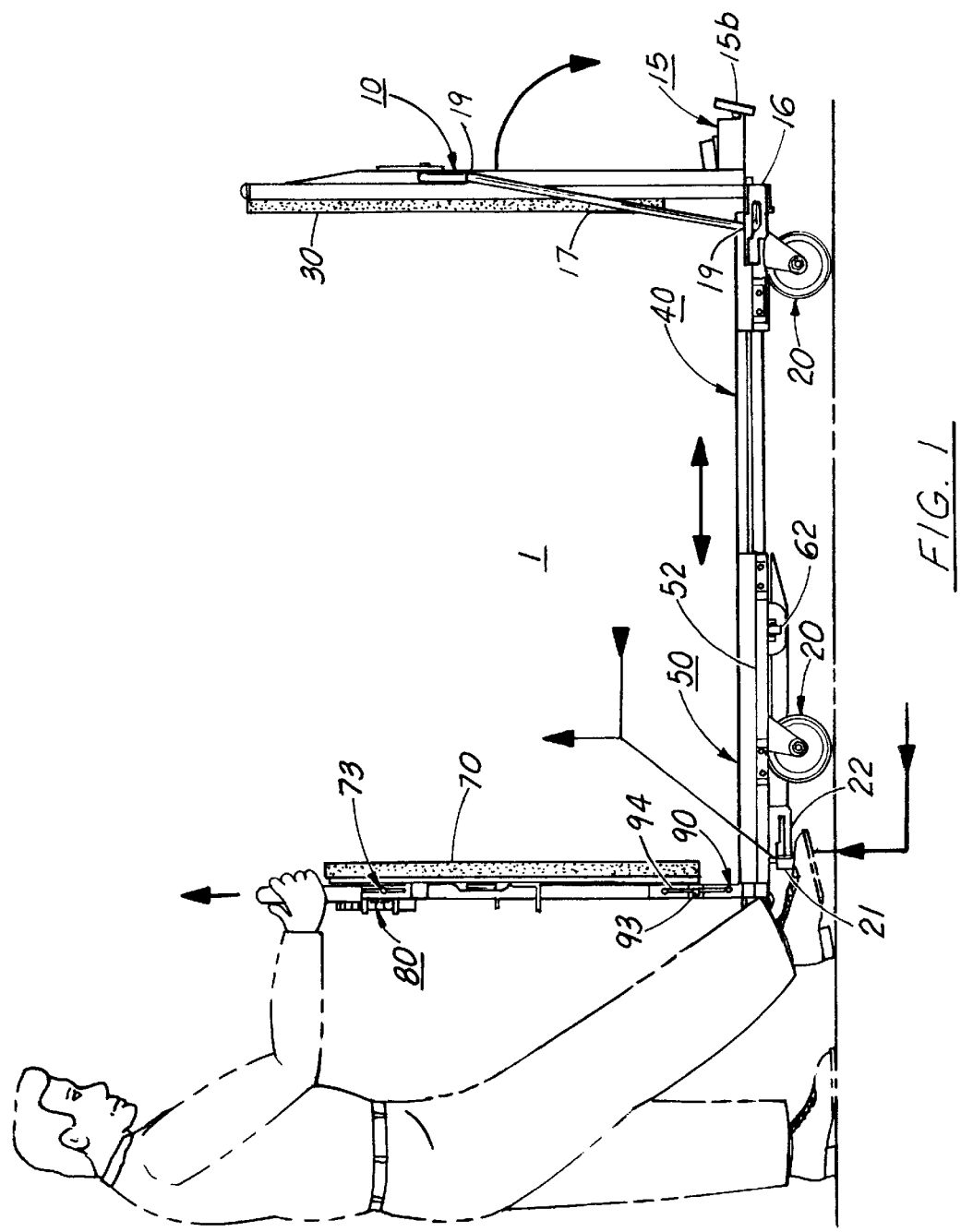
FIG. 1 is a side view of the assembled parts of the currently preferred, exemplary embodiment of the moving system of the invention, including the handle end platform and the ramp end platform sections, showing the mover or user after having moved the proximal, near side, caster lock lever back and up with his foot (note both the upper and lower horizontal and vertical directional arrows), allowing the corresponding caster wheel to freely swivel (as also shown in FIG. 4), with the longitudinally expandable (note double-headed directional arrow) moving system in a medial length configuration and with the ramp end of the system pulled up in its vertical disposition maintained under the action of side elastic cords or springs.
Figure 2:
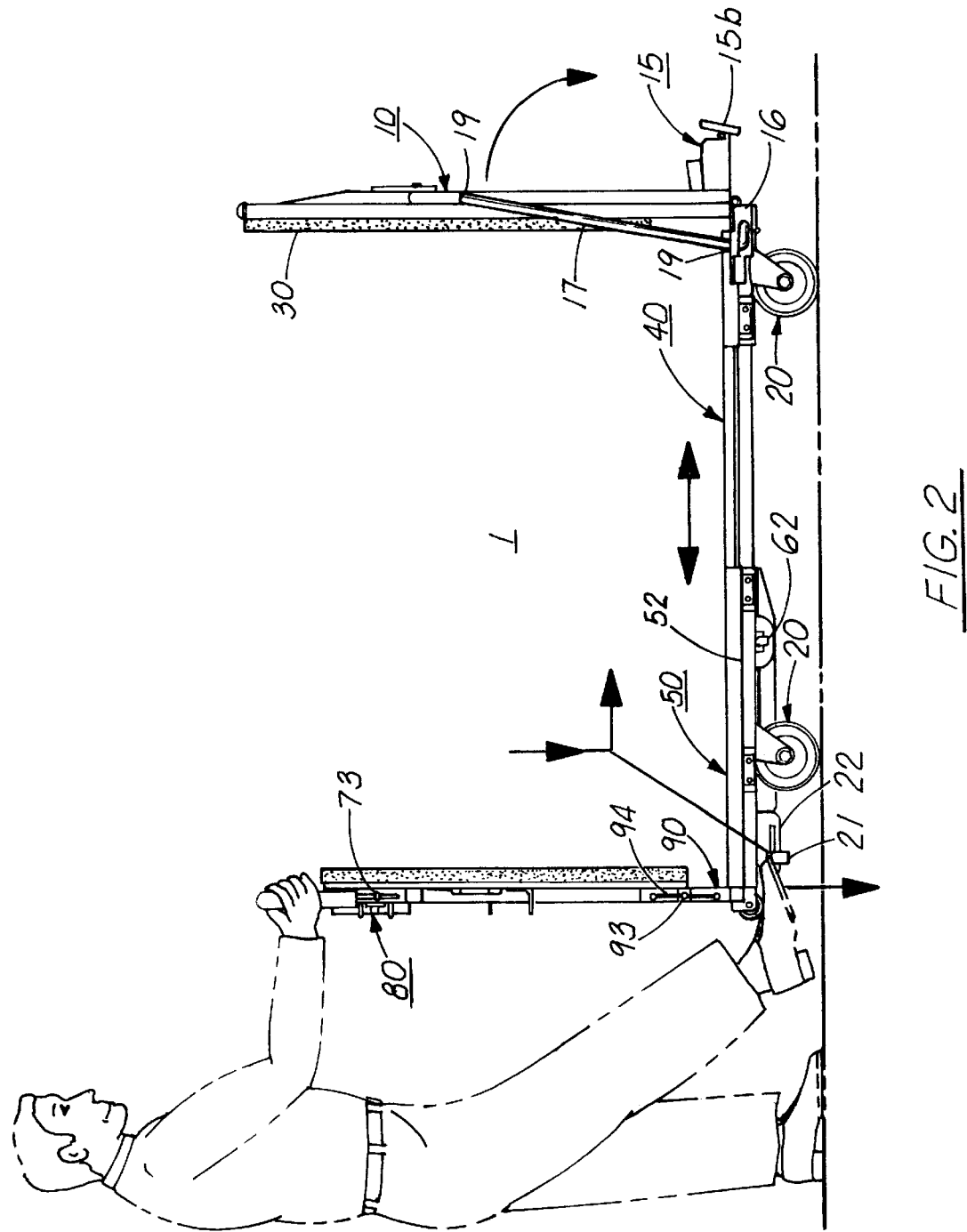
FIG. 2 is a side view similar to that of FIG. 1, but with the mover or user moving with his foot the proximal caster lock lever down (note lower, down directional arrow), allowing it to then move back into its engageable, lockable position (note upper set of down and left arrows), the engaged, locked disposition being shown in FIG. 3, which allows the caster wheels to only move in a straight, longitudinal direction.

As can be seen in FIGS. 1, 2 & 7, the preferred, exemplary embodiment of the moving system 1 of the present invention includes the following basic parts or sections:

a main ramp end section 10 which is moveable back and forth from a vertical, load holding disposition to a down, ramping disposition, with an associated braking or immobilizing support member 15;

a protective pad 30 for the ramp end section 10;

a first, horizontal platform section 40 adjacent and connected to the ramp end section 10;

a second, horizontal platform section 50 adjacent to the handle end and having an auxiliary pivoting, intermediate braking member 60 on its underside (see FIGS. 7 & 7C), with the two platform sections 40 & 50 moveably connected together;

a handle end section 70;

a vertically extendible handle 80 removably connected to the handle end section 70; and an interconnecting, ninety (90°) degree, leg section 90 (note FIG. 7) connecting the handle end section 70 to the platform section 50.

The primary material for the ramp members, platform, auxiliary brake support and handle end sections 10, 40, 50, 60 & 70 is, for example, aluminum. A supplemental ramp piece can be included (see ramp piece 20 of Ser. No. 08/213,162), which is usually stored on the exterior side of the ramp end section 10 when not in use but is connectable to the end of the main ramp section 10, thereby extending the effective ramping distance and diminishing its pitch.

The various parts of the system are assembled and interrelated together in the following manner.

The two platform sections 40 & 50 are sized and nestingly held together in a manner which allows them to be moved longitudinally one over the other to vary the effective longitudinal length of the moving system to accommodate various sized loads. This is accomplished in the exemplary embodiment by using a pair of flanking, parallel, male members 41, which are inserted into a like pair of female members 53 (note FIGS. 5 & 5A) located on the underside of the platform section 50.

Additionally, the handle end 70, working in combination with the telescoping, mating male legs 91 (FIG. 7) on the interconnecting leg section 90, which legs interface and mate with a pair of like female channels 51 (note FIGS. 3 & 7) on the underside of the platform section 50, can be pulled out away from that platform section, further increasing the effective longitudinal length of the system 1 (compare, for example, FIGS. 2 & 3 of Ser. No. 08/213,162).

As can be seen, at least one of the male leg members 41 and at least one of the male legs 91 have a series of longitudinally spaced holes (41a & 91a, respectively) along their lengths to allow them to be matingly locked together with their respective mates, using pin mechanisms 55 & 56, respectively, inserted into selected, aligned holes between the mated pairs. These two, longitudinally extended sets of mating pairs of members are separately, removably locked together by elastically, "bungee" cord biased, laterally directed pins 55 & 56, which lockingly mate with the varying selected pin holes 41a & 91a, respectively. It is noted that only the leg 41 on the side seen in FIG. 6 needs to have holes 41a for selectively mating with the locking pin 55 on the handle platform subsection 50, although a like mating set could be provided on the opposite side, if so desired, or the side of the holes switched. This is likewise true of the leg 91 on the side seen in FIG. 7.

As can best be seen in FIG. 7, the handle end section 70 has a pair of flanking, vertically extending, male members 71, which nest within like configured, vertically extending, female channel members 92 of the interconnecting leg section 90. These two mating pairs of members, similar to the mating pairs for the members 41 and legs 91, are removably locked together by elastically biased, laterally directed pins 93 which lockingly mate with the pin holes 72. When it is desired to remove the handle end section 70 from the interconnecting leg section 90, the lateral pins 93 are merely laterally pulled out against the biasing force of the elastic members 94, disengaging the pin lock and allowing the male legs 71 to be pulled up out of the female channels 92.

In like fashion the handle 80 can be removed from the handle end section 70 by disengaging the laterally directed, elastically biased, locking pin 73 (note FIGS. 1 & 2) from its removably locking engagement with the selected one of female pin holes in the handle legs (note legs 81 and pin holes 82 in Ser. No. 08/213,162). Having a series of vertically spaced pin holes allows the handle 80 to be placed at a user selected height (note vertical directional arrow in FIGS. 1 or 2) for the user's convenience and for varying the effective amount of lever action when the handle is used to, for example, pick up the ramp section (10) end of the moving system 1 when the handle is pulled down, or be lowered to get under any longitudinally extended members on the load (e.g. highly positioned paper trays extending out from the copier load).

The removal of the handle end section 70 and the handle 80 from the unit 1 allows for ease and flexibility in storage of the unit, while the removal of the handle 80 from the handle end section 70 also allows for enhanced clearance in certain tight quarters.

The moving system 1 includes a total of four, heavy-duty caster wheels 20, two in the front by the ramp end section 10 and two in the rear by the handle section 70, with a pair on each side. Thus, the platform sections 40 & 50 include four, supporting caster wheels (20), the two, proximal, rear ones at the handle end 70 being lockable into a straight disposition (FIG. 3) using a downward foot movement (note lower directional arrow in FIG. 2) or, alternatively, unlocked to allow them to be free-wheeling (FIG. 4) using an upward and rearward (i.e. toward the handle end) foot movement (note directional arrows in FIG. 1) on the near side of the handle end of the platform section 50.

The handle end or rear caster wheels 20 typically are held in their locked, straight position during use, causing the moving system 1 to be more easily controlled, in somewhat similar fashion to that of a grocery shopping cart, which allows only its front wheels to swivel. However, sometimes it is desirable to have the rear, handle-end caster wheels 20 freely swivel, for example, in tight spots where maximum maneuverability is desired.

When free wheeling (FIG. 4) is desired and as can be seen in FIG. 1, for each rear caster wheel the upper or in-step side of the front of the user's foot is moved up against the underside of the outer lever arm 21 and rearwardly, which, with reference to FIG. 3A, causes the lever arm to be moved from its initial, standard, distal position 21a in the slot 23 of the guide member 22 to its relatively temporary, proximal position 21b, which unlatches the swivel of the associated caster wheel 20.

In reviewing FIGS. 1 & 3A, it should be understood that the latter is from the perspective of the opposite side of the moving system 1 than the side shown in the former. Hence the illustrated directions of travel of the two figures are opposite to one another, with one figure showing the arrangement on one side of the moving system while the other shows the arrangement on the other side. It should be further understood that the caster latching and unlatching arrangement illustrated in FIGS. 3–4 are included on both sides, one being the mirror image of the other.

With further reference to FIG. 3A, when the lever arm 21 is moved to the right by the user's foot, the lever arm 21 preferably has an inherent tendency to rise due to the mounting geometry of the inner end 26 of the lever arm 21 and the spring pull from the standard, swivel latching member 25 (substantively identical to the swivel latch lock mechanisms 25 shown in FIG. 2 of Lee's U.S. Pat. No. 3,633,774). This inherent bias and it forced movement in a distal direction causes the lever arm 21 to move proximally and up into the proximal, detent area and be held therein by the stop edge 24 and the spring bias.

When it is desired to return the two rear caster wheels 20 to their straight ahead, fixed swivel positions, the user (note FIG. 2) merely places the front sole or shoe bottom onto the top of the lever arm 21 and pushes it down out of the detent past the stop edge 24, and the lever arm, thus freed, snaps into its locking, distal disposition under the action of the spring bias. If the associated caster wheel 20 does not happen to then be in its straight ahead position, the pin of the latch lock 25 will ride on the peripheral edge of the ring member 27. When the moving system 1 is pushed ahead by the user pushing from the handle end, the rear caster wheels 20 have an inherent tendency to then align themselves straight ahead on their own and at this point the spring biased pin on the latching mechanism 25 enters into a notch in the ring 27, locking the swivel in the straight ahead position.

Of course, when it is again desired to make the rear caster wheels 20 free-wheeling, the above described process of FIG. 1 is merely repeated.

Thus, the unlatching and latching of the rear swivels 20 is each achieved with quick and easy foot actuated or operated motions, avoiding the necessity of bending over or having to reach down under the platforms to directly engage and pull the swivel locks 25. This easy, foot actuated, latching and unlatching is in sharp contrast to the relatively awkward, underneath hand-pulling of the standard latch lock mechanisms 25 shown in FIG. 2 of Lee's U.S. Pat. No. 3,633,774 (note also col. 2, lines 12–15 thereof).

In somewhat like but different fashion, laterally directed, inwardly biased pins 55 (note FIG. 6) and 59 (note FIGS. 7, 7A & 7B) are used to latch and unlatch the legs 91 of the handle end section 70 to the platform section 50, and to latch and unlatch the platform section 50 to the platform section 40, respectively, both of which are foot actuatable.

With respect to the former and with reference to FIG. 6, the platform section 40 includes two, parallel, male extensions 41, with the near side extension having a series of holes 41a along its length, which extensions telescope into mating female channels 53. A stop member 43 in the form of a threaded rod includes on its distal end a block 44 and on its proximal end nuts 45a & 45b (note FIG. 6A). The presence of the block 44 prevents the male extensions 41 from being pulled too far out from the female channels 53 due to the presence of a vertical projection (not seen in the illustration) on the bottom of the near extension. When the vertical projection comes into contact with the block 44, the extensions 41 cannot be pulled any further out, preventing the two platform sections from becoming completely separated from one another.

The laterally extending pin 55 is biased inwardly by a "bungee" or shock cord 54 so that its distal tip will protrude into a hole 41$a$ positioned next to it. This engagement locks the two platform sections 40 & 50 together. When its is desired to unlatch the two, the user or rigger merely pushes the top of his foot against the interior side of the proximal end or downwardly extended head of the pin 55 and pulls it out against the biasing force of the "bungee" cord 54. A final, small upward movement causes the head to catch on the upwardly extending edge 51 of the platform section 50, temporarily holding the pin 55 out in its unlatched disposition. (This edge engaging action can be seen with reference to the analogous pin mechanism 56 in FIG. 7B.) Alternatively, a flat bar can be provided underneath the platform upon which the head of the pin 55 can be caught and engaged.

When it is desired to re-engage the latch, the user merely put the sole of his foot on the top of the caught head and pushes it down, causing it to be released with the biasing cord 54 pulling its distal tip into any hole 41$a$ which might be positioned next to it. If no hole is positioned exactly next to the pin's distal tip, a little movement of the platform sections with respect to one another will cause a hole to be aligned with the distal tip, again latching the two platform sections 40 & 50 together.

With respect to the leg pin 59 and with reference to FIGS. 7, 7A & 7B, the platform section 50 includes two, parallel, female channels 51, into which the legs 91 are matingly inserted with each of the legs 91 having a series of holes 91$a$ along its length. The laterally extending pin 59 is biased inwardly by a "bungee" or shock cord 57 so that its distal tip will protrude into a hole 91$a$ positioned next to it. This engagement locks the leg section 90 (with its attached handle section 70) to the platform section 50.

When its is desired to unlatch the two, the user or rigger for each of the side latches merely pushes the top of his/her foot under the interior side of the proximal end or downwardly extended head of the pin 59 and pulls it out against the biasing force of the "bungee" cord, with a final, small upward movement, which causes the head to catch on the upwardly extending edge 51 of the platform section 50, temporarily holding the pin 59 out in its unlatched disposition. This edge engaging action can be seen in FIG. 7B. Alternatively, a flat bar can be provided underneath the platform upon which the head of the pin 59 can be caught and engaged.

When it is desired to re-engage the latch, the user merely put the sole of his foot on the top of the caught head and pushes it down, causing it to be released with the biasing cord pulling its distal tip into any hole 91$a$ which might be positioned next to it. If no hole is positioned exactly next to the pin's distal tip, a little movement of the handle leg section 90 and the handle end platform section 50 with respect to one another will cause a hole to be aligned with the distal tip, again latching the leg section 90 to the platform section 50. No special effort is entailed in this regard, as the next natural movement of the system 1 will inherently cause a hole and the distal pin tip to become aligned.

With reference to FIGS. 7 & 7C and their auxiliary braking member 60, a friction pad 61 (made e.g. of rubber) is mounted on a pivot axis 63 which allows it to move (note curved directional arrow) from an upper, storage disposition to a lower braking position (phantom lined position). In its upper, storage position, the auxiliary brake is latched and locked in position by means of the laterally directed pin 62 which is biased inwardly by a "bungee" cord. When the user or rigger wishes to engage (i.e. lower) the auxiliary brake 60, he merely uses the edge of his/her foot to move the head of the pin 62 outwardly against the biasing force of the "bungee" cord, unlatching the brake and allowing it to pivot down under its own weight. Once unlatched and the brake 60 lowered, the pin 62 under spring bias is allowed to move back into its inward, biased position.

When it is desired to return to the auxiliary into its upper, storage position, the rigger merely bends down and manually lifts the auxiliary brake 60 back up about the pivot members 63, causing the brake to become re-latched into its storage position.

Thus, as can be seen from the foregoing, the user's foot is used to quickly and easily actuate or operate the locks or latches for:

locking the platform's rear caster wheels 20 at the handle end of the platform, into a straight, longitudinal direction or, alternatively, to a free moving disposition, allowing the rear caster wheels to freely swivel or rotate about a vertical axis in any direction; and latching and unlatching the telescoping, handle end and intermediate platform members (90, 50 & 40) to be relatively longitudinally moved with respect to one another and set, allowing the longitudinal effective length of the platform to be varied as needed for different sized loads and also be easily and quickly latched and unlatched without bending over using only the movement of the user's foot to operate or actuate the latching mechanism; and unlatching the underlying auxiliary brake member 60.

However, it should be understood that the various foot actuated mechanisms can be hand-actuated, if so desired. The latter approach may be more desirable when, for example, the user or rigger is already bending over for another reason and it is then easier to use the hand to move the actuating mechanism(s) rather than the foot.

The end ramp section 10 includes on each of its sides a like, biasing, off-set "bungee" cord 17. Instead of "bungee" or shock cords 17, springs could be used. An exemplary spring would have, for example, a eleven-sixteenths ($^{11}/_{16}$") inch diameter and an over-all length of twenty-two (22") inches (unloaded) with an expansion capability of seven and a quarter (7.25") inches, with two (2") inches of the expansion being used up in loading it in the ramp's erect position, and four (4") inches used in its being stretched as the ramp is moved down into its ramping disposition. The springs would preferably be enclosed in clear vinyl tubing.

The off-set of the "bungee" cord or springs 17 causes the elastic "bungee" cords to be in a non-parallel, inwardly extending alignment when the ramp section 10 is in its vertical disposition, causing the elastic cords to flexibly bias the ramp section into its vertical disposition. However, when it is desired to move the ramp section 10 down into its ramping disposition, the user merely pulls the main ramp panel out and down against the force of the elastic biasing cords or springs 17 until the ramp section's entry end nearly reaches the ground, and the cords then change their biasing direction to either be neutral or tend to pull the main ramp panel down into its ramping disposition, with gravity itself being the main force bringing and maintaining the ramp down.

This desired biasing action is achieved by the effective terminating points (as explained more fully below with respect to the earlier embodiment's cord terminal points 119a & 119b (FIG. 15) of the cord portions 17 being off-set to the same side of the hinge point as the desired biasing force when the ramp section 10 is moved at least to its upper disposition, i.e., when the ramp section is vertical (FIGS. 1 & 2). Such an arrangement provides a very flexible, relatively inexpensive, reliable and effective hinging and biasing action. Thus, although shown in its vertical or near vertical disposition in FIGS. 1 & 2, the "bungee" cord portions or springs 17 allow the ramp end 10 to take many different, angular dispositions, accommodating many differently sized and configured loads.

As can best be seen in FIGS. 1 & 2, the ramp section 10 includes at its platform end a braking foot structure 15, which supports the platform end of the main ramp panel on the floor or ground when the end ramp section is down in its ramping disposition. The braking structure 15 includes on a pivot a rubber support pad 15b, which provides an effective braking and immobilizing force, while being free to pivot to angularly align itself with the floor or ground. A safety chain latch (note element 15c of FIGS. 2+ & 8 of Ser. No. 08/213,162) can be provided, if so desired).

A sponge or rubber pad 30 can be included in association with the inner side of the main ramp section 10 to provide a relatively soft, load contacting surface when the ramp section is in its vertical disposition (note FIGS. 1 & 2). A like pad 75 is included on the inner side of the handle end section 70.

The platform dolly sections 40 & 50 each include a pair of heavy duty caster wheels 20, while the interconnecting leg section 90 has a pair of roller elements or small wheels 95 at its central, ninety (90°) degree intersection.

The second platform section 50 also includes on its underside the pivoting, auxiliary braking member 60, which is selectively moved down into a supporting disposition when needed (note FIG. 7C). When not in use, the braking member 60 is held up in place by means of a spring latch 62. After use, the braking member is merely pivoted up into the bottom of the platform section 50 until it is re-latched.

In use the brake support 60 has a rubber pad 61 on its bottom support surface to enhance its frictional braking and immobilizing capabilities. When the pivoted auxiliary brake 60 is unlatched, it falls under its own weight into its near vertical disposition (note phantom lined position and curved arrow in FIG. 7C), and, when the mover pulls the platform to the rear, the brake support pops up into its braking position. Due to its designed length, the braking support causes one or more of the heavy duty caster wheels 20 typically those at the rear, to come off the floor or ground, leaving a gap between them and the support surface. It is noted that, for example, approximately about ninety (90%) percent of the load rests on the brake support 60, whether the unit 1 is carrying a load or not.

Side edge walls 42 & 52 are included along the sides and the handle end of the two platform sections 40 & 50, respectively, to prevent the load's wheels from moving off of the sides or handle end of the platform sections. It is noted that the platform sections 40 & 50 and their side walls 42 & 52 are laterally dimensioned and configured so that they can telescopingly nested together for relative longitudinal movement over one another.

The upper surfaces of sections 10, 40 & 50 provide smooth, rolling surfaces made of, for example, aluminum sheeting, for ease of rolling a load unto the unit 1.

A number of belts typically also are included with the system 1 to, for example, strap the load and end sections 10 & 70 together, when so desired.

When the parts of the system 1 are disassembled, they can be readily stacked up against a wall, one against the other, for easy storage when not in use. Such a disposition also allows for easier shipment of the disassembled system 1.

Methodology Involved in Using Moving System

Typically the moving system 1 is maintained on an interim basis with its parts and sections in their various raised dispositions and the sections nestled together in its minimum sized disposition supported on its own heavy duty caster wheels 20.

When it is desired to immobilize the moving system unit 1, particularly in certain tight quarters, the user can pull and disengage the latch pin 62, freeing the auxiliary braking support 60 to fall down under the force of gravity and come swinging down (note curved direction arrow). A pull on the handle end 70 causes the end of the platform section 50 adjacent to the platform subsection 40 to come up over and be carried by the now seated, auxiliary braking support 60. With such action causing the rear caster wheels 20 to be lifted up off the ground, the braking support 60 effectively immobilizes the system 1, and it no longer moves when typical forces are applied.

A particularly efficacious, tight situation in which the intermediate braking support 60 is used is on, for example, a moving truck's lift gate located at the rear of the truck. In such a situation, the implementation of the braking support 60 while the dolly unit 1 is on the lift gate prevents the unit from rolling off of the lift gate.

Alternatively and more desirably, space permitting, the moving unit 1 is immobilized using the ramp braking support 15 by lowering the ramp end 10. The pivoted ramp end 10 is easily and quickly moved down against the biasing force of the "bungee" cord sections or springs 17 by pulling down on it, with the arrangement illustrated allowing the ramp end section 10 to be moved down (or up) in less than a second or two. Thus, when the ramp end 10 is pulled down against the biasing force of the "bungee" cord sections or springs 17 until it snaps down onto the floor, the braking support 15 raises up the front dolly or caster wheel 20 off of the ground or floor, effectively immobilizing the system 1 against forces in either longitudinal direction, with a resisting force greater than that provided by the intermediate, auxiliary braking support 60. Additionally, the ramp braking support 15 is better on a sloped floor, since any movement of the unit 1 in a direction to the right when viewed from the perspective of FIGS. 1 & 2 would cause the intermediate braking support 60 to come off of its supporting disposition, although a supplemental lock could be added to lock the intermediate support into its supporting disposition, if so desired.

With the ramp 10 down the user pulls out the pin 55 (note FIGS. 5–6), which was locking the two platform subsections 40 & 50 together, and pulls them away from each other a desired distance to effectively initially increase the effective longitudinal length of the combined platform sections and then re-locks them. The user then can further expand the effective, longitudinal length of the system 1 by pulling out the locking pin 59 and pulling out the legs 91 further from the female channels 51 of the adjacent platform section 50 (note upper, horizontal direction arrow) and then locking them back together again when the desired length is reached. Alternatively, the handle end section 70 can be initially pulled out from the platform subsection 50 and re-locked, and then the platform subsections 40 & 50 pulled out and re-locked.

When the moving job ultimately is finished, the reverse procedures are followed in returning the unit 1 back to its compact, shortened disposition.

Having the availability of both, alternate braking supports 15 & 60 is very important, because sometimes space constraints makes lowering the ramp section 10 impossible. In such cases, the auxiliary brake support 60 is used to immobilize the system 1, while in other cases, which is more usually the situation, the brake support 15 is used. Also, the availability of the two braking supports allows the system 1 to be used by only one person, when only one person is available, with the braking supports effectively providing the sole user with "an extra pair of hands." Thus, for example, with the ramp section 10 down, a sole user can readjust the relative positions of the handle end section and the platform section 40, as well as those of the platform subsections 40 & 50, as needed, as well as rolls machines on and off the extended platform subsections 40 & 50 using the ramp section 10, all without assistance and without worry that the system 1 will move while the work is going on.

Thus, when the ramp end section 10 is lowered by pulling on its upper end against the biasing force of the "bungee" cords or springs 17, until the main ramp panel snaps down into its ramping disposition shown in the figure, at which time the "bungee" cords or springs then bias the ramp section 10 down, when in this disposition the ramp braking support 15 supports the platform end of the ramp section 10 on the ground through the pivoting pad 15b. The load then can be easily and safely "ramped" up onto the platform subsections 40 & 50 using its relatively light duty, "convenience casters".

Once the load is fully up on the platform sections 40 & 50, the ramp end section 10 is raised up by the user into its vertical disposition against the initial retarding biasing action of the "bungee" cord sections or springs 17, with their biasing action then causing the ramp section 10 to be "snapped" up into its vertical disposition. Typically the user preliminarily gauges the needed length for the load in initially extending the platform subsections 40 & 50 and the handle end panel 70 through the legs 91 with respect to the section 40, so that the load and its caster wheels are properly locatable on the platform subsections 40 & 50.

The end sections 10 & 70 are, for example, strapped together with a belt, and the load is now ready to be moved to its desired location using the heavy duty casters 20, with the load then being fully protected and cushioned. Alternatively, a strap or belt could be passed just around the ramp end of the load, and a gap can exist between that end of the copier and the pad part 30 of the ramp end section 10, allowing the ramp section to be easily and quickly pulled down when so desired.

Once the load is properly secured on the dolly unit 1, if the ramp section end 10 of the loaded moving system 1 needs to be moved up over an obstruction (e.g. a curb, door threshold, etc.), the user merely has to push down on the handle 80 with his/her foot pressing down on the leg structure between the small wheels 95 (see FIG. 7), causing the ramp end to be raised up in a lever action using the rear caster wheels 20 as a fulcrum. When it is desired to pick-up the handle end of the system 1, hand-holds on the backside of the handle end section 70 can be used.

Figure 15:
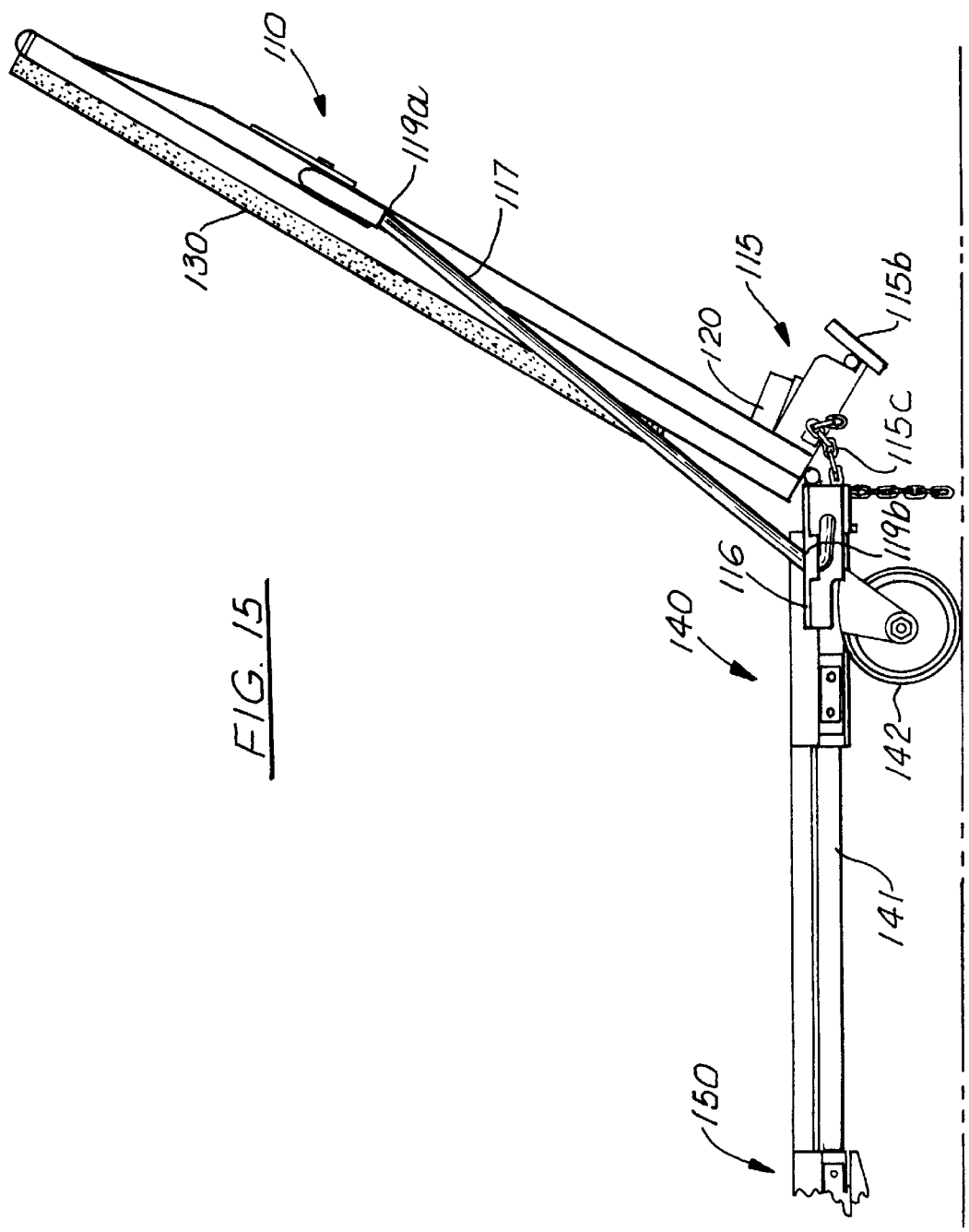
FIG. 15 is a side, detail view of the ramp end of the platform dolly of the system, showing the chain latching of the support leg of the ramp section to the ramp interconnecting subsection, which immobilizes the hinged parts for safety and ease of removal and/or replacement of the ramp from the adjacent platform subsection.

If so desired, a safety chain can also be employed (note FIG. 15 and chain 115c).

Earlier Moving System Parts & Structure

Figure 8:
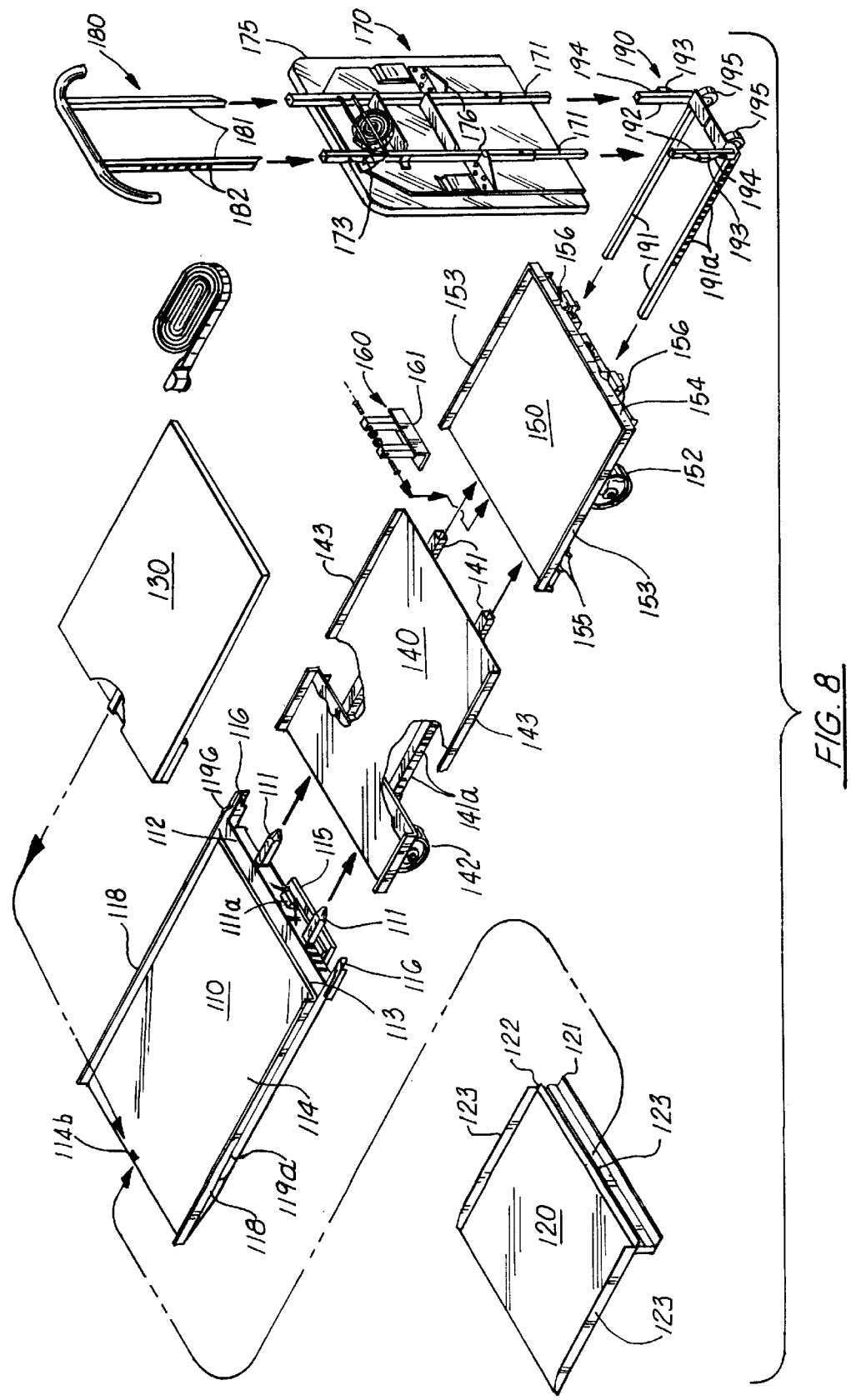
FIG. 8 is an exploded, perspective view of the various parts and sections of another, earlier, preferred, exemplary embodiment of the moving system of the present invention, with portions of some of the elements being cut-away to expose underlying parts, with the perspective being from the handle end of the moving system.

As can be seen in FIG. 8, the additional, earlier, preferred, exemplary embodiment of the moving system 101 of the present invention includes the following basic parts or sections:

a main ramp end section 110 which is moveable back and forth from a vertical, load holding disposition to a down, ramping disposition, with a braking or immobilizing support member 115;

a supplemental ramp piece 120, which is usually stored on the exterior side of the ramp end section 110 when not in use but is connectable to the end of the main ramp section 110, thereby extending the effective ramping distance;

a protective pad 130 for the ramp end section 110;

a first platform section 140 adjacent to the ramp end section 110;

a second platform section 150 adjacent to the handle end and having a supplemental, pivoting, intermediate braking or immobilizing member 160;

a handle end section 170;

an extendible handle 180; and an interconnecting, ninety (90°) degree, leg section 190. The primary material for the ramp members, platform, brake support and handle end sections 110, 120, 140, 150 & 170 is aluminum. The various parts of the system are assembled and interrelated together in the following manner.

The two platform sections 140 & 150 are sized and nestingly held together in a manner which allows them to be moved longitudinally over one another to vary the effective longitudinal length of the moving system to accommodate various sized loads. This is accomplished in the exemplary embodiment by using a pair of flanking, parallel, male rod members 141, which fit into a like pair of female, channel members located on the underside of the platform section 150. Additionally, the handle end 170, working in combination with the telescoping, mating male legs 191 on the interconnecting leg section 190, which legs interface and mate with a pair of like female channels on the underside of the platform section 150, can be pulled out away from that platform section, further increasing the effective longitudinal length of the system 101 (compare FIGS. 9 & 10).

As can be seen, one mated set of the male leg members 141 and both pair of the male legs 191 have a series of longitudinally spaced holes (141a & 191a) along their lengths to allow them to be matingly locked together with their respective mates using pins inserted into selected, aligned holes between the mated pairs. These two, longitudinally extended sets of mating pairs of members are separately, removably locked together by elastically, "bungee" cord biased, laterally directed pins 155 & 156 (note FIG. 12), which lockingly mate with the varying selected pin holes 141a & 191a, respectively. It is noted that only the leg 141 on the side seen in FIGS. 8 & 12–14 needs to have holes 141a for selectively mating with the locking pin 155 on the handle platform subsection 150, although a like mating set could be provided on the opposite side, if so desired.

The handle end section 170 has a pair of flanking, vertically extending, male members 171, which nest within like configured, vertically extending, female channel members 192 of the interconnecting leg section 190. These two mating pairs of members, similar to the mating pairs for the members 141 and legs 191, are removably locked together by elastically biased, laterally directed pins 193 which lockingly mate with the pin holes 172. When it is desired to remove the handle end section 170 from the interconnecting leg section 190, the lateral pins 193 are merely laterally pulled out against the biasing force of the elastic members 194, disengaging the pin lock and allowing the male legs 171 to be pulled up out of the female channels 192.

In like fashion the handle 180 can be removed from the handle end section 170 by disengaging the laterally directed, elastically biased, locking pin 173 from its removably locking engagement with the selected one of the female pin holes 182 in the handle legs 181. Having a series of vertically spaced pin holes 182 allows the handle 180 to be placed at a user selected height for the user's convenience and for varying the effective amount of lever action when the handle is used to, for example, pick up the ramp section (110) end of the moving system 101 when the handle is pulled down, or be lowered to get under any longitudinally extended members on the load (e.g. highly positioned paper trays extending out from the copier load).

The removal of the handle end section 170 and the handle 180 from the unit 101 allow for ease and flexibility in storage of the unit, while the removal of the handle 180 from the handle end section 170 also allows for enhanced clearance in certain tight quarters.

The end ramp section 110 includes two, flanking leg pins 111, which are inserted into the open ends of the channels 141 on the first platform section 140, with a spring latch 111a used to lock the two sections together. A laterally disposed hinge 113 is located just above the pin subsection 112, which allows the main, end panel 114 to be pivotally moved with respect to the platform section 140 from a vertical disposition (note, e.g. FIGS. 9 & 10) to a down, ramping disposition (note FIGS. 11–13). The side extensions 116 are included to provide an inner terminus for the "bungee" cords 117. Longitudinally extending, strengthening ribs 114a (note FIGS. 11 & 12) are included at the entry end of the ramp section 110 to strengthen the main ramp panel 114 to allow it to take heavy loads without any undue bending.

A pair of side, flanking "bungee" cord portions 117 each extend from an upper, raised point 119a toward the top of the ramp section 110 down to a terminus 119b on its respective side extension 116 on the hinged pin subsection 112 at a point significantly removed or spaced from the hinge 113. The side extensions 116 are included to provide an inward and preferably lower terminus 119b for the elastically biased, flexible "bungee" cord portions 117. It is noted that the "bungee" cord portions 117 viewable on both sides of the unit 101 are formed from one, continuous "bungee" chord extended laterally across the ramp end section 110 and terminated at the terminal ends 119b, although two, independent, elastic cords could be used, if so desired.

Figure 9:
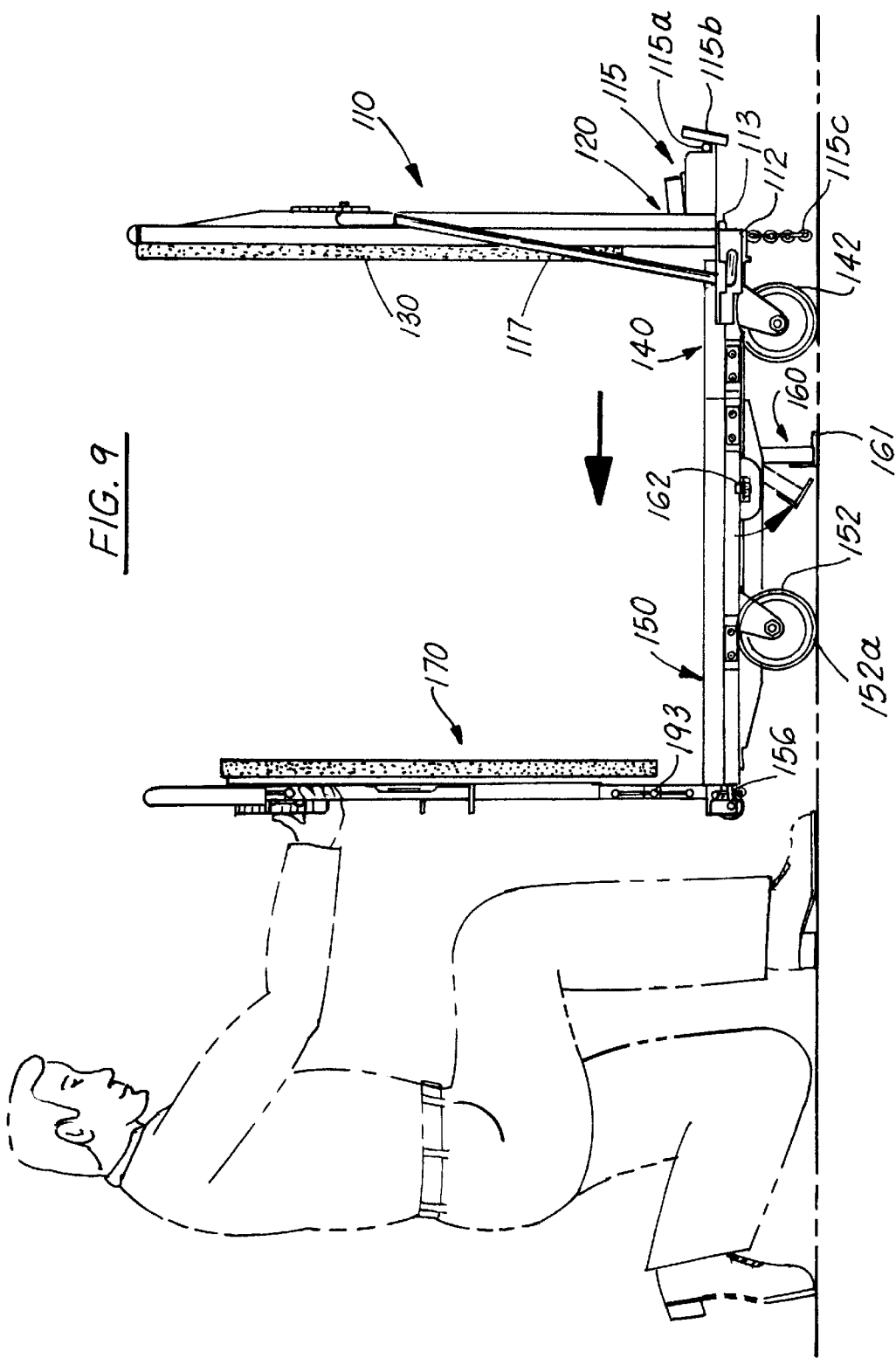
FIG. 9 is a side view of the assembled parts of the embodiment of FIG. 8 showing the mover or user moving (note horizontal directional arrow) the platform section at the handle end of the system, with the system in its most minimized, shortest length configuration, with the interim, intermediate braking support moving down (note phantom lined position and curved direction arrow) into its centralized supporting & braking disposition due to the braking leg having been released and under the leftward movement of the system, and with the ramp end of the system pulled up in its vertical disposition maintained under the action of the side elastic cords.
Figure 10:
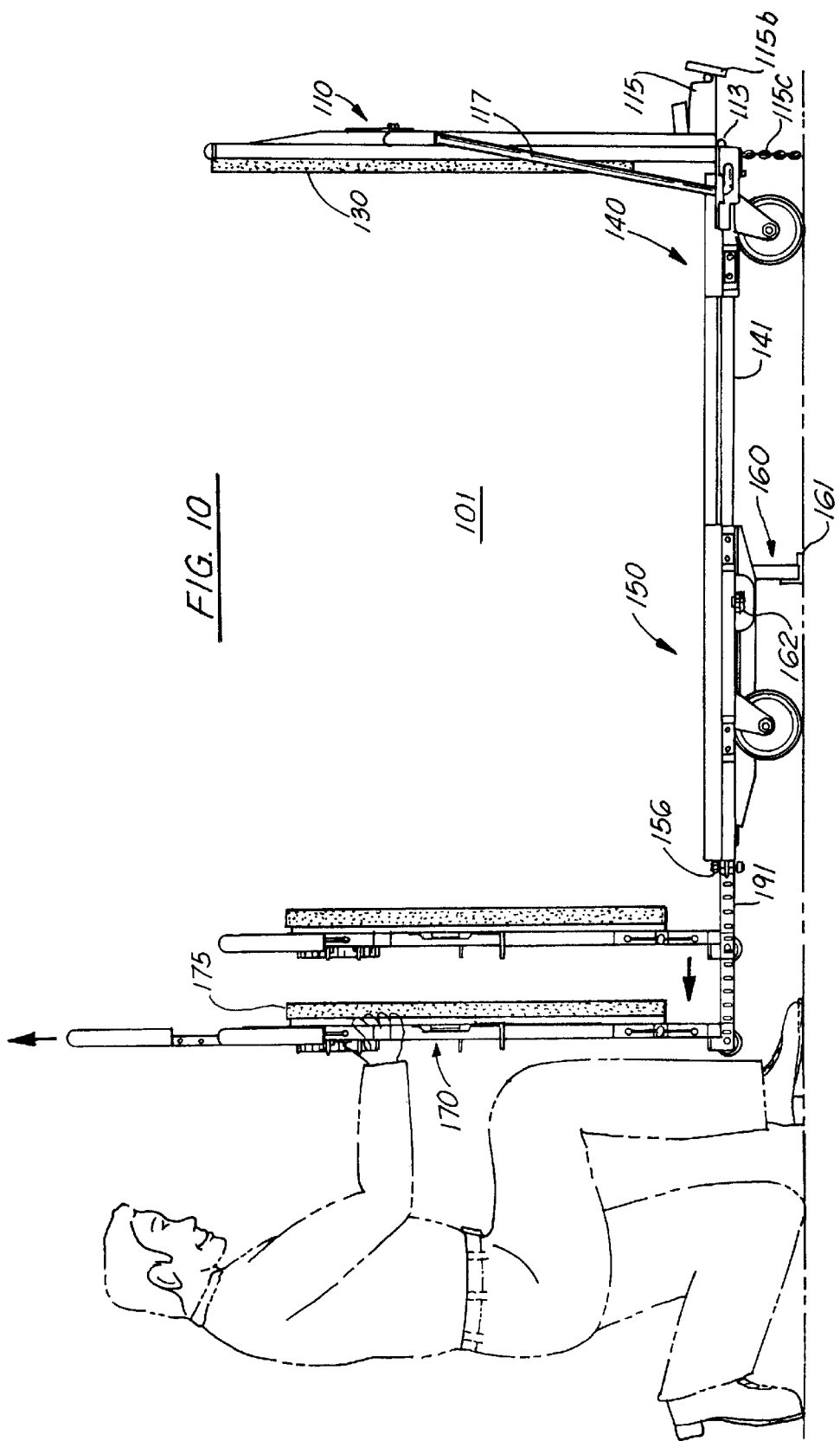
FIG. 10 is a side view similar to that of FIG. 9, with the intermediate braking support with its rubber bottom pad effectively immobilizing the system after the mover or user has already pulled out the platform subsection at the ramp end of the system, with the figure showing the user pulling out or expanding the platform subsection at the handle end (note initial phantom lined position & horizontal direction arrow) out away from the rest of the platform substantially increasing its effective longitudinal length; the figure further illustrates in phantom line the possible removal up of the handle section (note removed phantom lined handle and vertical direction arrow).

As can be seen in FIGS. 9 & 10, this off-set causes the elastic "bungee" cords 117 to be in a non-parallel, inwardly extending alignment when the ramp section 110 is in its vertical disposition, causing the elastic cords to flexibly bias the ramp section into its vertical disposition. However, when it is desired to move the ramp section 110 down into its ramping disposition (FIGS. 11–13), the user merely pulls the main panel 114 out and down against the force of the elastic biasing cords 117 until the ramp section's entry end nearly reaches the ground, and the cords then change their biasing direction to tend to pull the main panel 114 down into its ramping disposition.

This desired biasing action is achieved by the effective terminating points 119a, 119b of the cord portions 117 being off-set to the same side of the hinge point as the desired biasing force when the ramp section 110 is moved to either of its two dispositions, i.e., when the ramp section is vertical (FIGS. 9 & 10) a line joining the terminal points 119a & 119b lie to the inner side of the hinge 113, while, when the ramp section is down (FIGS. 11–13) a line joining the terminal points 119a & 119b lie to the outer side of the hinge 113. Such an arrangement provides a very flexible, relatively inexpensive, reliable and effective hinging and biasing action. Alternatively, as noted above in the "summary" portion hereof, because the weight of the ramp 110 itself provides a built-in bias, little if any offset is needed for achieving and maintaining a bias for the ramp section 110 to stay down when in its ramping disposition (note FIG. 11).[4]

[4] In essentially copying the pertinent portions of the '94 spec. for inclusion herein, this sentence was added, based on the substantively identical disclosure of the "summary" portion of the '94 spec.

Figure 14:
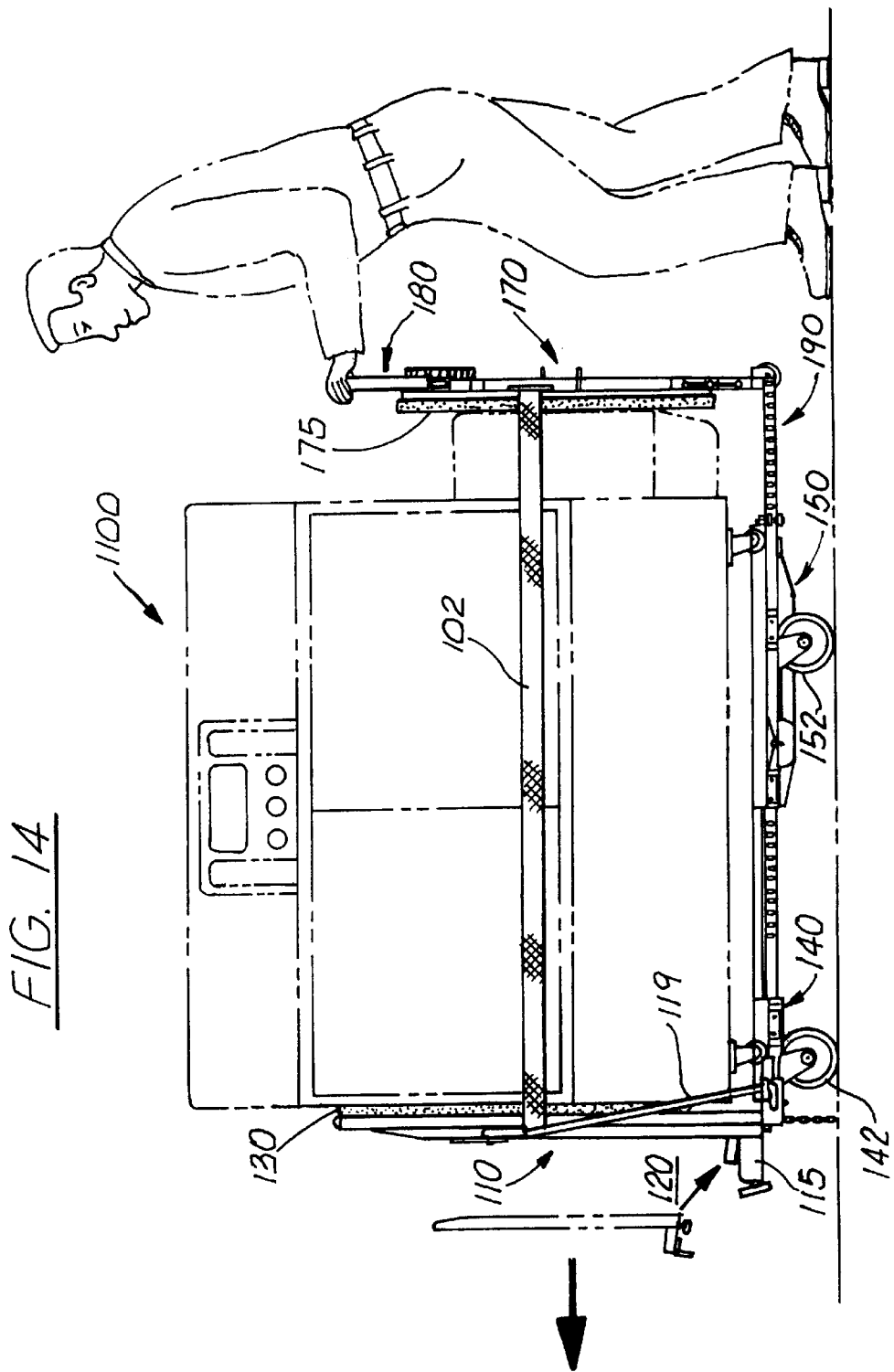
FIG. 14 is a further side view with the load completely up on the platform subsections of the system and secured within the moving system, with all of the parts moved back in together again to the system's smallest size consistent with the length of the load, with the supplemental ramp section stored on the exterior side of the ramp end section, and the load ready to be moved to its desired destination by the mover on the protective system of the invention.

Although shown in its vertical or near vertical disposition in FIGS. 9, 10 & 14, the "bungee" cord portions 117 allow the ramp end 110 to take many different, angular dispositions, accommodating many differently sized and configured loads (note, for example, the further exemplary, obtuse angle illustrated in FIG. 15).

Figure 11:
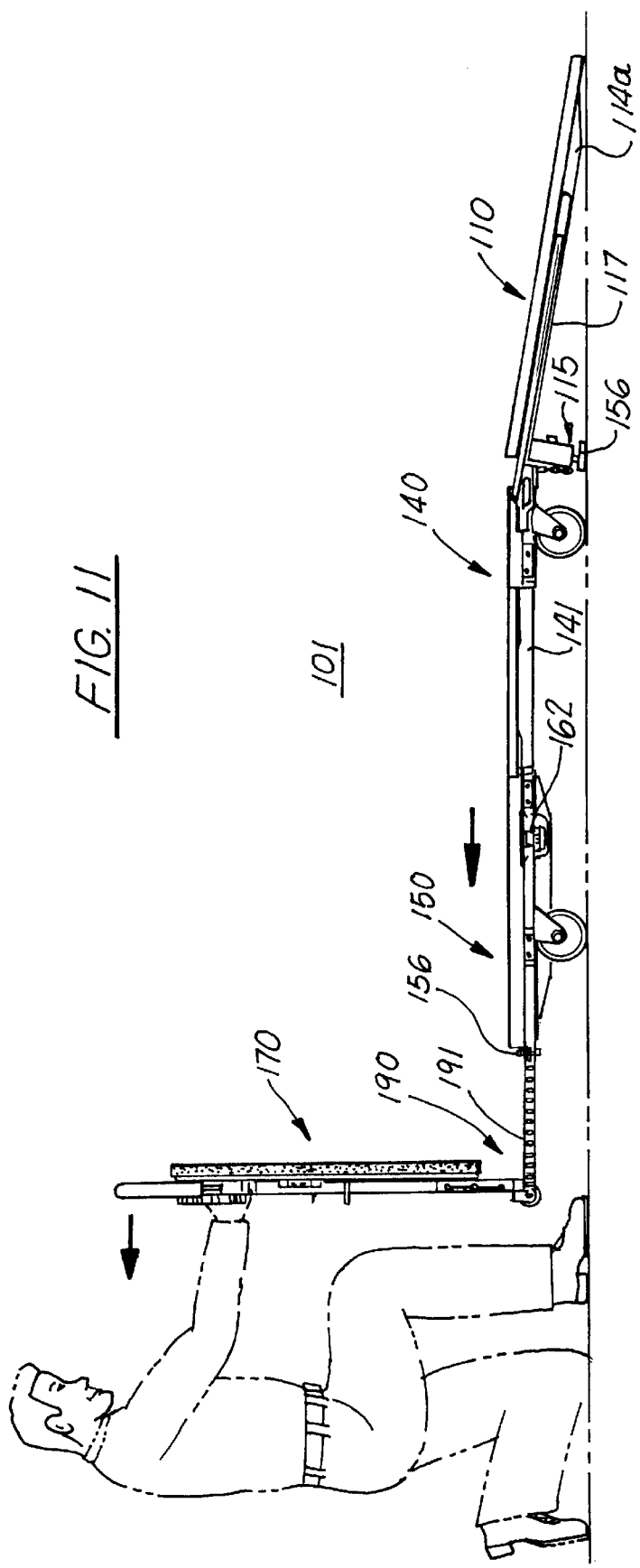
FIG. 11 is a side view similar to that of FIG. 10, but with the end ramp section down in its ramping disposition with its pivoting support & braking member and bottom rubber pad even more effectively immobilizing the system (allowing the intermediate braking support to have been moved back up) while the mover or user pulls the platform subsections at the ramp end and the handle end of the system even further out away from the rest of the unit (as illustrated, note direction arrows), increasing even more its effective longitudinal length; this disposition of the system is the ideal position (space allowing) for the longitudinal expansion (or contraction) of the platform subsections.
Figure 12:
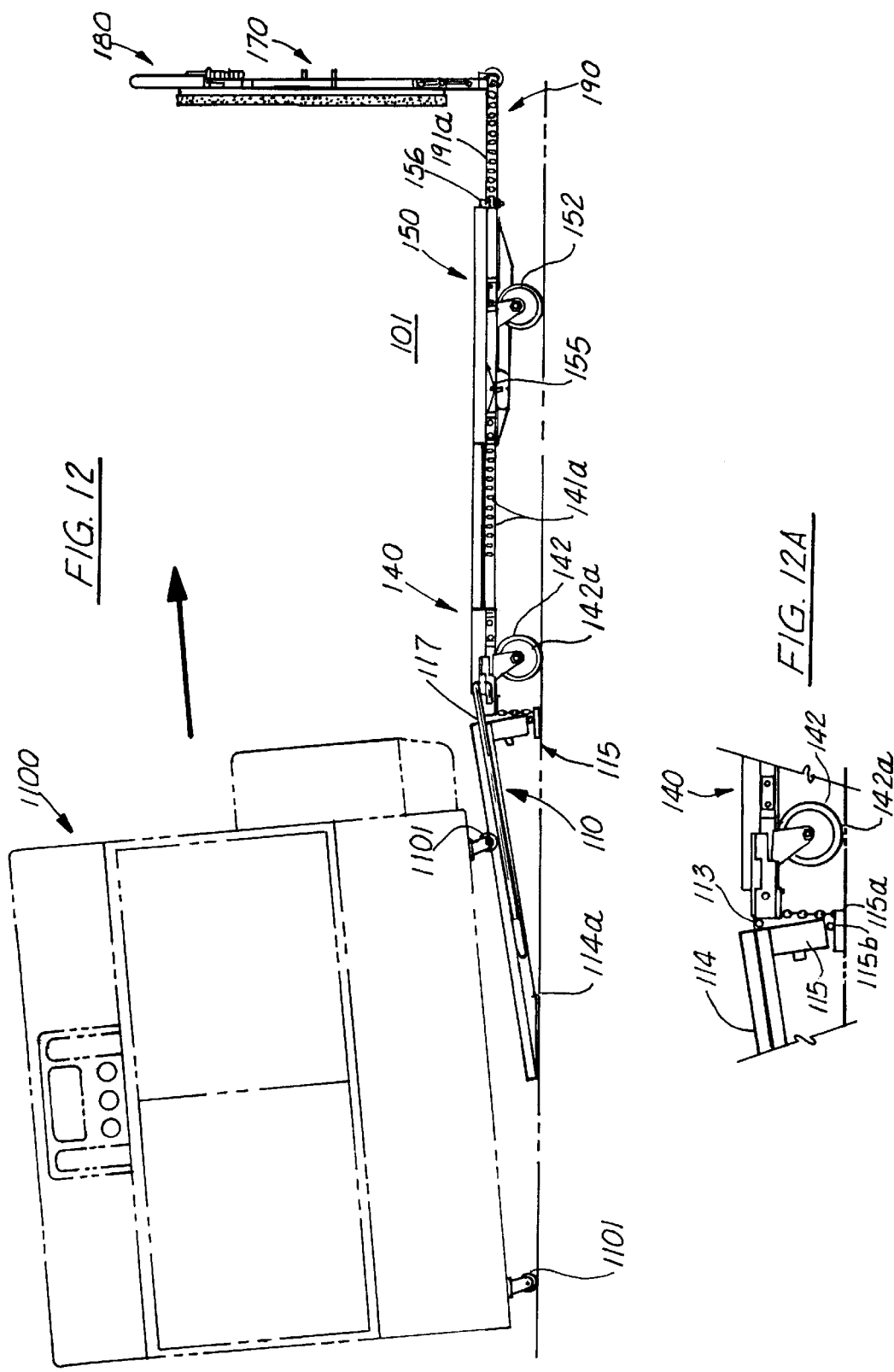
FIG. 12 is a side view from the other side of the system, with the ramp platform section and the handle end section pulled out and with the ramp end of the system pulled down into its ramping disposition as in FIG. 11, allowing the load to be rolled up (note direction arrow) onto the platform subsections of the system, with the ramp leg brake continuing to effectively immobilize the system, a detailed, partial view of which is shown in FIG. 12A (with the biasing "bungee" cord removed to show the underlying details), better showing, for example, the raising up of the dolly wheel off of the ground or floor due to the presence of the ramp support.
Figure 13:
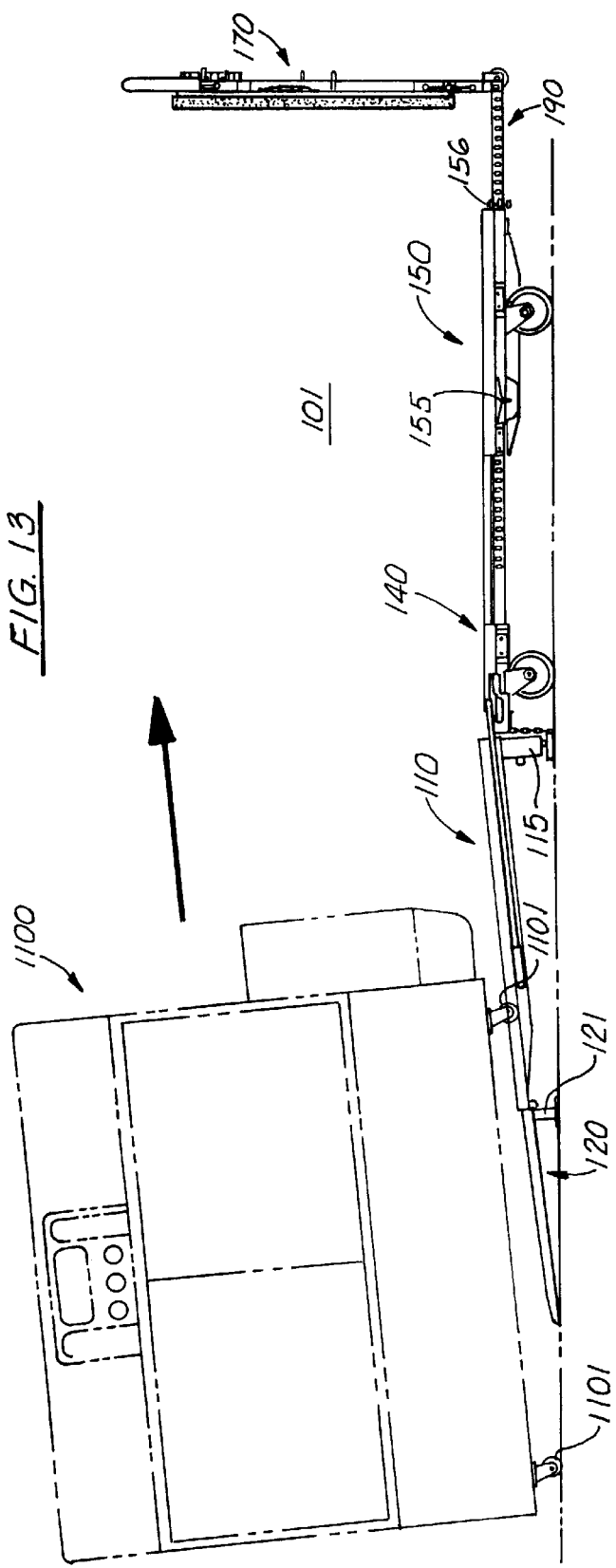
FIG. 13 is a side view similar to that of FIG. 12, but with a supplemental ramp section being added to the ramp end of the system to provide a more gradual or extended ramp entry onto the platform subsections of the system, which can be particularly useful when dealing with a particularly heavy or bulky load.

As can best be seen in FIGS. 11–13, the ramp section 110 includes at its platform end a braking foot structure 115, which supports the platform end of the main ramp panel 114 on the floor or ground when the end ramp section is down in its ramping disposition. The braking structure 115 includes on a pivot 115a a rubber support pad 115b (note FIG. 9), which provides an effective braking and immobilizing force, while being free to pivot to angularly align itself with the floor or ground, whether the main ramp panel 114 is at the angle shown in FIG. 12 or the angle shown in FIG. 13. A safety chain latch 115c (note FIGS. 9+ and 15) is provided to temporarily attach the hinge subsection 112 to the ramp braking support 115 when it is desired to remove the ramp section 110 from the adjacent platform section 140.

The supplemental ramp section 120 referred to above is usually kept in a storage location on the under or out side of the end ramp section 110, held there by a nesting and swing latch arrangement, until it is needed to effectively extend and make more gradual the needed ramping action than is provided by the main ramp section panel 114 alone (compare FIGS. 12 & 13). When needed, it is removed from its storage location and placed at the entry end of the ramp panel 114 using an integral leg section 121 and ledge 122 to raise the entry end of the panel 114 up off the floor or ground (see FIG. 13). As can be seen in FIGS. 8 & 13, the ramp section 120 includes side edge walls 123 and a pin 124, and a hole 114b arrangement is used to further locate and stabilize the two ramp sections 114 & 120. It should be noted that, when nested for storage, the supplemental ramp 120 does not interfere with the normal operation of the main ramp 110.

A sponge or rubber pad 130 is included in association with the inner side of the main ramp section 110 to provide a relatively soft, load contacting surface when the ramp section is in its vertical disposition (note FIG. 14). A like pad 175 is included on the inner side of the handle end section 170.

The platform dolly sections 140 & 150 each include a pair of heavy duty caster wheels 142 & 152, respectively, while the interconnecting leg section 190 has a pair of roller elements or small wheels 195 at its central, ninety (90°) degree intersection. The rear caster 152 have four-way swivel locks. Except when maneuvering in tight quarters, these locks are used to lock the caster swivels in the trailing (rear) position for optimum control.

The second platform section 150 also includes on its underside the pivoting, supplemental, intermediate braking and immobilizing support member 160, which is selectively moved into a supporting disposition when needed (note FIGS. 9 & 10). When not in use, the braking member 160 is held up in place by means of a spring latch 162. After use, the braking member is merely pivoted up into the bottom of the platform section 150 until it is re-latched. In use the brake support 160 has a rubber pad 161 on its bottom support surface to enhance its frictional braking and immobilizing capabilities. When the holding brake 160 is unlatched, it falls under its own weight into its near vertical disposition and, when the mover pulls the platform to the rear, the brake support pops up into its braking position. Due to its designed length, the braking support causes one or more of the heavy duty caster wheels 142, 152, typically the latter, to come off the floor or ground, leaving a gap 152*a*. It is noted that, for example, approximately about seventy (70%) percent of the load rests on the brake support 160, whether the unit 101 is carrying a load 1100 or not.

Side edge walls 118, 123, 143 & 153 are included along the sides of the end and supplemental ramp sections 110 & 120 and the two platform sections 140 & 150, respectively, to prevent the load's wheels 1101 from moving off of the sides of the ramp sections or the platform sections. The final platform section 150 also includes an end wall 154. It is noted that the platform sections 140 & 150 and their side walls 143 & 153 are laterally dimensioned and configured so that they can telescopingly nested together for relative longitudinal movement over one another.

The upper surfaces of sections 110, 120, 140 & 150 provide smooth, rolling surfaces made of, for example, aluminum sheeting, for ease of rolling a load onto the unit 101.

A number of belts or straps 102 typically also are included with the system 101 to, for example, strap the load 1100 and end sections 110 & 170 together, as seen in FIG. 14, when so desired.

When the parts of the system 101 are disassembled as shown in FIG. 8, they can be readily stacked up against a wall, one against the other, for easy storage when not in use. Such a disposition also allows for easier shipment of the disassembled system 101.

Methodology Involved in Using Earlier Moving System

Typically the moving system 101 is maintained on an interim basis with its parts and sections in their various raised dispositions and the sections nestled together in its minimum sized disposition supported on its own heavy duty caster wheels 142, 152, all as shown in FIG. 9.

When it is desired to immobilize the moving system unit 101, particularly in certain tight quarters, the user can pull and disengage the latch pin 162, freeing the braking support 160 to fall down under the force of gravity and come swinging down (note curved direction arrow). A pull on the handle end 170, as shown in FIG. 9 (note horizontal direction arrow), causes the end of the platform section 150 adjacent to the platform subsection 140 to come up over and be carried by the now seated braking support 160. With such action causing the caster wheels 152 to be lifted up off the ground (note gap 152*a*), the braking support 160 effectively immobilizes the system 101, and it no longer moves when typical forces are applied in the direction shown in FIG. 9.

A particularly efficacious, tight situation in which the intermediate braking support 160 is used is on, for example, a moving truck's lift gate located at the rear of the truck. In such a situation, the implementation of the braking support 160 while the dolly unit 101 is on the lift gate prevents the unit from rolling off of the lift gate.

Alternatively and more desirably, space permitting, the moving unit 101 is immobilized using the ramp braking support 115 by lowering the ramp end 110, as generally illustrated in FIG. 11. The pivoted ramp end 110 is easily and quickly moved down against the biasing force of the "bungee" cord sections 117 by pulling down on it, with the arrangement illustrated allowing the ramp end section 110 to be moved down (or up) in less than a second or two. Thus, when, as in FIG. 11, the ramp end 110 is pulled down against the biasing force of the "bungee" cord sections 117 until it snaps down onto the floor, the braking support 115 raises up the dolly wheel 142 off of the ground or floor (note gap 142*a*), effectively immobilizing the system 101 against forces in either longitudinal direction, with a resisting force greater than that provided by the intermediate braking support 160. Additionally, the ramp braking support 115 is better on a sloped floor, since a strong force or significant movement of the unit 101 in a direction to the right when viewed from the perspective of FIG. 10 could cause the intermediate braking support 160 to come off of its supporting disposition, although a supplemental lock could be added to lock the intermediate support into its supporting disposition, if so desired. Additionally, the "sensitivity" of the platform braking support 115 to forward movement can be varied by changing the angle it makes with the floor.

With the ramp 110 down the user pulls out the pin 155 (note FIG. 12+), which was locking the two platform subsections 140 & 150 together, and, as can be seen in FIG. 11, pulls them apart (note lower, horizontal direction arrow) a desired distance to effectively initially increase the effective longitudinal length of the combined platform sections and then relocks them. As also can be seen in FIG. 11, the user then can further expand the effective, longitudinal length of the system 101 by pulling out the dual locking pins 156 and pulling out the legs 191 from the adjacent platform section 150 (note upper, horizontal direction arrow) and then locking them back together again when the desired length is reached. Alternatively, the handle end section 170 can be initially pulled out from the platform subsection 150 and relocked, and then the platform subsections 140 & 150 pulled out and relocked. If two workers are available, the two extensions can be concurrently employed. When the moving job ultimately is finished, the reverse procedures are followed in returning the unit 101 back to the compact, shortened disposition of FIG. 9.

Having the availability of both, alternate braking supports 115 & 160 is very important, because sometime space constraints makes lowering the ramp section 110 impossible. In such cases, the intermediate brake support 160 is used to immobilize the system 101, while in other cases, which is more usually the situation, the ramp brake support 115 is used due to its greater braking capability. Also, the availability of the two braking supports allows the system 101 to be used by only one person, when only one person is available, with the braking supports effectively providing the sole user with "an extra pair of hands." Thus, for example, with the ramp section 110 down, a sole user can readjust the relative positions of the handle end section and the platform section 140, as well as those of the platform subsections 140 & 150, as needed, as well as rolls machines 1100 on and off the extended platform subsections 140 & 150 using the ramp section 110, all without assistance and without worry that the system 101 will move while the work is going on.

Thus, as can be seen with reference to FIGS. 11 & 12, when the ramp end section 110 is lowered by pulling on its upper end against the biasing force of the "bungee" cords 117, until the main ramp panel 114 snaps down into its ramping disposition shown in the figure, at which time the "bungee" cords then bias the ramp section 110 down, when in this disposition the ramp braking support 115 supports the platform end of the ramp section 110 on the ground through the pivoting pad 115*b*, as seen in the detail view of FIG. 12A. The load 1100 then can be easily and safely "ramped" up onto the platform subsections 140 & 150 (note direction arrow) using its relatively light duty, "convenience casters" 1101.

Alternatively, if the load is particularly bulky and heavy and it is desired to have a more gradual ramping gradient, the supplemental ramp subsection 120 can be removed from its storage disposition on the external, underside of the main ramp panel 114 and placed at the entry end of the main ramp panel as illustrated in FIG. 13. In this alternative arrangement the entry end of the main ramp panel 114 is supported on the upper, end ledge 122 of the supplemental ramp structure 120, which in turn is supported on the floor or ground by the support leg structure 121. The load 1100 then can be more easily or more gradually "ramped" up onto the platform sections 140 & 150 (note direction arrow), again using the copier's relatively light duty, "convenience casters" 1101.

Once the load 1100 is fully up on the platform sections 140 & 150, the ramp end section 110 is raised up by the user into its vertical disposition against the initial retarding biasing action of the "bungee" cord sections 117, with their biasing action then causing the ramp section 110 to be "snapped" up into its vertical disposition. Typically the user preliminarily gauges the needed length for the load 1100 in initially extending the platform subsections 140 & 150 and the handle end panel 170 through the legs 191 with respect to the section 140, so that the load 1100 and its caster wheels 1101 are properly locatable on the platform subsections 140 & 150. However, if some final, length adjustment is desired after the load is on the platform, the dolly unit 101 can be temporarily supported on the braking support 160 and, after unlocking the appropriate pin(s), the ramp section 110 pushed in with respect to the platform subsection 150, shortening the unit, or, alternatively, the handle end section 170 pulled out with respect to the platform subsection 140, lengthening the unit. Alternatively, the ramp section 110 could be again lowered and either side of the unit shortened or lengthened, as desired.

If the supplemental ramp structure 120 was used (as shown in FIG. 13), it is returned to its storage disposition on the external, underside of the ramp section 110, as shown in phantom line and the direction arrow in FIG. 14.

The end sections 110 & 170 are, for example, strapped together with the belt 102, as illustrated in FIG. 14, and the load is now ready to be moved (note larger directional arrow) to its desired location using the heavy duty casters 142 & 152, with the load 1100 then being fully protected and cushioned. Alternatively, and as will typically be the case, the strap 102 could be passed just around the ramp end of the load 1100, and a gap can exist between that end of the copier and the pad part 130 of the ramp end section 110, allowing the ramp section to be easily and quickly pulled down when so desired and even easily removed if need be. The latter thus allows the ramp end 110 to be easily moved down to immobilize the load 1100 and moving unit 101.

Once the load 1100 is properly secured on the dolly unit 101, if the ramp section end 110 of the loaded moving system 101 needs to be moved up over an obstruction (e.g. a curb, door threshold, etc.), the user merely has to push down on the handle 180, causing the ramp end to be raised up in a lever action using the caster wheels 152 a s a fulcrum. When it is desired to pick-up the handle end of the system 11, hand-holds 176 (see FIG. 8) on the backside of the handle end section 170 can be used.

With reference to FIG. 15, a safety chain latch 115*c* is provided to temporarily attach the hinge subsection 112 to the ramp braking support 115. When it is desired to remove or replace the ramp section 110 from the adjacent platform section 140, the safety chain latch 115*c* is used to temporarily attach the hinge subsection 112 to the end ramp section via the braking support 115 to temporarily immobilize the two hinged parts for safety reasons. This feature is added to prevent possible injury to the user from the hinged subsection 112 from unexpectedly snapping shut against the ramp section 110 under the significant force of the "bungee" cord sections 117. This temporary attachment, by negating the forces of the "bungee" cord sections' strong bias to bring the hinged parts toward each other, makes the step of attaching and/or removal of the end ramp section 110 from the adjacent platform section 140 easy. Thus, when the ramp section latch 111*a* is unlatched and the pins 111 pulled out from their female nests in the platform section 140, the ramp parts are restrained from possibly dangerous movements under the strong action of the biasing "bungee" cord portions 117 attempting to forcibly bring them together.

It is noted that the embodiment described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A method of a moving heavy load of the order of hundreds of pounds, which load has its own wheels, comprising the following steps:

a) providing a moving system, including at least one, longitudinally extended, platform, dolly section capable of carrying the heavy load on its upper surface;

at least three heavy duty, swivelled, caster wheels on the underside of said platform section capable of carrying the platform section with its heavy load across the floor, at least one of said caster wheels being lockable in a straight ahead position preventing it from swiveling;

a foot actuated mechanism located on the underside of said platform section and associated with the lockable one of said caster wheels, said foot actuated mechanism including a moveable lever arm connected to a spring biased latch and extending out adjacent to one edge of said platform section, the movement of said lever arm under the action of the user's foot causing said one of said caster wheels to become latched preventing swiveling and unlatched allowing swiveling, depending on the direction of movement of said lever arm;

an end ramp section hingedly connected by a hinge to one end of said platform section and being moveable from an upwardly extended disposition down to a floor contacting, ramping disposition for rolling the heavy load up it unto said platform section, said end ramp section including at least one elastic, flexible, elongated member extending from an upper portion of said ramp section to a lower portion, said elastic member biasing said ramp section in an upward disposition when it is raised up; and a pivoting, platform braking support member located on the underside of said platform section and having high friction material on a bottom, floor contacting surface; and lowering said platform braking member about its pivot to its downward most position by moving a laterally extending, resiliently biased pin mechanism laterally out using an exteriorly exposed, downwardly protecting head, engaging said head with one's foot pulling it out, causing said braking member to become unlatched, allowing it to fall and pivot down under the action of gravity, with said platform section then being supported at least in significant part by said platform braking member, raising at least some of said casters off of the floor, effectively immobilizing the moving system from movement across the floor; and alternatively, over a period of time, moving said lever arm under the action of one's foot causing said one of said caster wheels to become latched preventing swiveling and thereafter unlatched allowing swiveling, depending on the direction of movement of said lever arm by one's foot.

2. The method of claim 1, wherein there is further included the step of:

thereafter manually raising said platform braking member about its pivot to it raised position locking it in place, returning all of said casters to riding on the floor.

3. The method of claim 1, wherein there is further included the steps of:

providing said moving system with at least two of said platform sections nested together; and alternatively, over a period of time, moving said sections longitudinally with respect to one another, varying their combined effective longitudinal length after moving a laterally extending, resiliently biased pin mechanism associated with a male member and engaging an exteriorly exposed, downwardly projecting head with one's foot pulling it out, causing said male member and a female channel to become unlatched, allowing relative longitudinal movement of said two platform sections.

4. The method of claim 1, wherein there is further included the steps of:

providing said moving system with a handle section, and an extendible leg section connecting said handle section to said platform section at its end opposite to said ramp section, said extendible leg section allowing the spacing between said ramp end section and said handle section to be longitudinally varied; and alternatively, over a period of time, moving said handle section and said platform section longitudinally with respect to one another by means of said extendible leg section, varying their combined effective longitudinal separation distances between said ramp end section and said handle section after moving a laterally extending, resiliently biased pin mechanism associated with a male member laterally outwardly and engaging an exteriorly exposed, downwardly projecting head with one's user's foot, causing it to be pulled out by the action of the user's foot, causing said male member and said platform section to become unlatched, allowing relative longitudinal movement of said platform section and said handle section.

5. A method for allowing a user to move a heavy load of the order of hundreds of pounds an extended distance, which load has its own wheels which generally do not allow the load to be moved over such an extended distance, comprising the following steps:

a) providing a moving system including at least one, longitudinally extended, platform, dolly section capable of carrying the heavy load on its upper surface;

heavy duty caster wheels on the underside of said platform section capable of carrying the platform section with its heavy load across a surface for the extended distance; and an end ramp section hingedly connected by a hinge to one end of said platform section and being manually moveable by the user from an upwardly extended disposition down to a floor contacting, ramping disposition for rolling the heavy load up it unto said platform section, said end ramp section including at least one elastic, flexible, elongated member extending from an upper portion of said ramp section to a lower portion, with said lower portion being associated with the platform section and being on the inner side of the hinge point when said ramp section is in its upwardly extending disposition and with said upper portion being at least near, if not on, the other, outer side of the hinge point when said ramp section is down in its ramping disposition, said elastic member biasing said ramp section in an upward disposition when it is raised up and allowing it to be biased down in a downward disposition when it is lowered to its ramping disposition, said ramp end section having an underside; and alternatively, over a period of time, manually moving said ramp section from its upwardly extended disposition and down to its ramping disposition and back up again, using the biasing forces and elasticity of said elastic member to bias said ramp section into its upwardly extended disposition, with the user needing to move the ramp section up from its ramping disposition until the biasing forces of said elastic member biases said ramp section into its upwardly extended disposition, but the ramping section otherwise naturally remaining in its ramping disposition after it has been pulled down there by the user; and further providing said moving system with a ramp braking support member located on the underside of said ramp end section and having a base with high friction material on its bottom, floor contacting surface; and lowering said ramp end section about said ramp end section's hinge point initially against the biasing force of said elastic member down to its ramping position until said ramp braking support member contacts the floor, raising at least some of said casters off of the floor, effectively immobilizing the moving system from movement across the floor.

6. The method of claim 5, wherein there is further included the steps of:

providing said platform section with an underside and said moving system with a pivoting, platform braking support member located on the underside of said platform section and having high friction material on a bottom, floor contacting surface; and lowering said platform braking member about its pivot to its downward most position with said platform section then being supported at least in significant part by said platform braking member, raising at least some of said casters off of the floor, effectively immobilizing the moving system from movement across the floor.

7. The method of claim 6, wherein there is further included the step of:

thereafter raising said platform braking member about said braking member's pivot to it raised position and locking it in place, returning all of said casters to riding on the floor.

8. A method of a moving heavy load of the order of hundreds of pounds, which load has its own wheels, comprising the following steps:

a) providing a moving system, including
- at least one, longitudinally extended, platform, dolly section capable of carrying the heavy load on its upper surface;
- at least three heavy duty, swivelled, caster wheels on the underside of said platform section capable of carrying the platform section with its heavy load across the floor; and
- a pivoting, platform braking support member located on the underside of said platform section and having high friction material on a bottom, floor contacting surface; and lowering said platform braking member about its pivot to its downward most position by moving a laterally extending, resiliently biased pin mechanism laterally out using an exteriorly exposed, downwardly projecting head, engaging said head with one's foot pulling it out, causing said braking member to become unlatched, allowing it to fall and pivot down under the action of gravity, with said platform section then being supported at least in significant part by said platform braking member, raising at least some of said casters off of the floor, effectively immobilizing the moving system from movement across the floor.

9. The method of claim 8, wherein there is further included the step of:
- thereafter manually raising said platform braking member about its pivot to it raised position locking it in place, returning all of said casters to riding on the floor.

* * * * *